(12) United States Patent
Kim et al.

(10) Patent No.: US 11,405,500 B2
(45) Date of Patent: Aug. 2, 2022

(54) KEY STRUCTURE, KEY INPUT METHOD AND ELECTRONIC DEVICE USING THE SAME

(71) Applicant: SAMSUNG ELECTRONICS CO., LTD., Suwon-si (KR)

(72) Inventors: Minsoo Kim, Suwon-si (KR); Joohan Kim, Suwon-si (KR); Gwangho Choi, Suwon-si (KR); Yeunwook Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/063,972

(22) Filed: Oct. 6, 2020

(65) Prior Publication Data

US 2021/0105352 A1 Apr. 8, 2021

(30) Foreign Application Priority Data

Oct. 8, 2019 (KR) .................. 10-2019-0124442

(51) Int. Cl.
| | |
|---|---|
| H04M 1/72466 | (2021.01) |
| G06F 3/0354 | (2013.01) |
| H04M 1/02 | (2006.01) |
| H04M 1/23 | (2006.01) |
| H04M 1/72424 | (2021.01) |
| H04M 1/72469 | (2021.01) |

(52) U.S. Cl.
CPC .... *H04M 1/72466* (2021.01); *G06F 3/03547* (2013.01); *H04M 1/026* (2013.01); *H04M 1/0279* (2013.01); *H04M 1/236* (2013.01); *H04M 1/72424* (2021.01); *H04M 1/72469* (2021.01)

(58) Field of Classification Search
None
See application file for complete search history.

(56) References Cited

U.S. PATENT DOCUMENTS

| | | | |
|---|---|---|---|
| 8,284,567 | B2 | 10/2012 | Park et al. |
| 9,588,643 | B2 | 3/2017 | Miller |

(Continued)

FOREIGN PATENT DOCUMENTS

| | | |
|---|---|---|
| CN | 106610746 A | 5/2017 |
| CN | 206193715 U | 5/2017 |

(Continued)

OTHER PUBLICATIONS

International Search Report and Written Opinion dated Jan. 26, 2021 in corresponding International Application No. PCT/KR2020/013460.

*Primary Examiner* — Quoc D Tran
(74) *Attorney, Agent, or Firm* — Nixon & Vanderhye P.C.

(57) ABSTRACT

The disclosure relates to a key structure, a key input method, and an electronic device using the same, and an operating method of an electronic device includes: identifying an input operation, by comparing output values of at least two sensors provided on a side surface of the electronic device and a threshold value; determining whether a function corresponding to the identified input operation exists; and, based on the corresponding function existing, executing the corresponding function. Accordingly, the electronic device can receive various input operations under a keyless structure.

20 Claims, 16 Drawing Sheets

(56) References Cited

U.S. PATENT DOCUMENTS

| | | |
|---|---|---|
| 10,466,830 B2 | 11/2019 | Lee et al. |
| 2011/0069024 A1 | 3/2011 | Kim |
| 2012/0306765 A1 | 12/2012 | Moore |
| 2017/0060301 A1* | 3/2017 | Li .......................... G06F 3/044 |
| 2017/0068322 A1* | 3/2017 | Steinberg ................ G06F 3/005 |
| 2017/0336970 A1* | 11/2017 | Kim .................... G06F 3/04883 |
| 2018/0059893 A1* | 3/2018 | Xu ........................ G06F 1/1626 |
| 2018/0121078 A1 | 5/2018 | Kim et al. |
| 2018/0314362 A1* | 11/2018 | Kim ..................... G06F 1/1637 |
| 2019/0033143 A1 | 1/2019 | Teil |
| 2020/0379598 A1* | 12/2020 | Kim ..................... G06F 3/0484 |
| 2021/0278945 A1 | 9/2021 | Li et al. |

FOREIGN PATENT DOCUMENTS

| | | |
|---|---|---|
| CN | 107300997 A | 10/2017 |
| KR | 10-2014-0147647 | 12/2014 |
| KR | 10-2017-0129372 | 11/2017 |
| KR | 10-2018-0028857 | 3/2018 |
| WO | 10-2018-0117815 | 10/2018 |

\* cited by examiner

KEY STRUCTURE, KEY INPUT METHOD AND ELECTRONIC DEVICE USING THE SAME

CROSS-REFERENCE TO RELATED APPLICATION

This application is based on and claims priority under 35 U.S.C. § 119 to Korean Patent Application No. 10-2019-0124442, filed on Oct. 8, 2019, in the Korean Intellectual Property Office, the disclosure of which is incorporated by reference herein in its entirety.

BACKGROUND

Field

The disclosure relates to a key structure, a key input method, and an electronic device using the same.

Description of Related Art

An electronic device typically includes an input sensor or a button to receive a user's input. In general, the electronic device may include a key indicator which protrudes or is recessed to inform a user of a position of the input sensor or the button, and may enable the user to perform a key input by pushing a position of the key indicator.

Such a physical key indicator may put a limit to designing an electronic device, and accordingly, a keyless structure without a key indicator is considered.

If a key indicator is configured in the form of a protrusion or a recess from a design perspective, a key pushing or swiping operation may cause user inconvenience like causing a pain.

In addition, a keyless structure which does not indicate a position of an input sensor on an outside of an electronic device for a user may make it difficult for the user to determine a position of a key, resulting in reduction of user convenience.

The above information is presented as background information only to assist with an understanding of the disclosure. No determination has been made, and no assertion is made, as to whether any of the above might be applicable as prior art with regard to the disclosure.

SUMMARY

Embodiments of the disclosure provide a keyless structure including an input sensor disposed on a portion or an entirety of a side surface of a housing to detect a deformation of the side surface caused by a user's pushing force, and a method for configuring active key mapping through association of inputs of a swiping operation and a pushing operation in the provided keyless structure.

Embodiments of the disclosure provide a method for determining key mapping based on a user's operation in a keyless structure, and receiving a user's input based on the determination.

Embodiments of the disclosure provide an electronic device using the keyless structure and the key mapping configuration method and the user input reception method described above.

The disclosure is not limited to the embodiments mentioned above.

According to various example embodiments of the disclosure, an electronic device may include: a housing including a first surface, a second surface, and a side surface surrounding a space between the first surface and the second surface; at least one sensor block comprising a sensor provided on an inner side of the side surface of the housing; a sensing unit comprising circuitry configured to receive and to process an output value output from the at least one sensor block; at least one processor operatively connected with the sensing unit; and at least one memory operatively connected with the at least one processor, and the at least one memory may store instructions that, when executed, cause the at least one processor to: identify an input operation, based on the output value received from the sensing unit; determine whether a function corresponding to the identified input operation exists; and, based on a corresponding function existing, execute the corresponding function.

According to various example embodiments of the disclosure, an electronic device may include: a housing including a first surface, a second surface, and a side surface surrounding a space between the first surface and the second surface; at least one sensor block comprising at least one sensor provided on an inner side of the side surface of the housing; a sensing unit comprising circuitry configured to receive and to process output values output from the at least one sensor block; at least one processor operatively connected with the sensing unit; and at least one memory operatively connected with the at least one processor, and the at least one memory may store instructions that, when executed, cause the at least one processor to: identify whether an input operation includes an operation of pushing after swiping or an operation of swiping after pushing, based on output values of at least two sensors received from the sensing unit; execute a volume up and down key position setting function in response to the identified operation of pushing after swiping or the identified operation of swiping after pushing; and set a volume up and down key position, based on at least one of a direction of the swiping operation, a start position of the swiping operation, an end position of the swiping operation, and a position where the pushing operation is performed, through the volume up and down key position setting function.

According to various example embodiments of the disclosure, a method of operating an electronic device may include: identifying an input operation, by comparing output values of at least two sensors provided on a side surface of the electronic device and a threshold value; determining whether a function corresponding to the identified input operation exists; and, based on a corresponding function existing, executing the corresponding function.

According to various example embodiments, the electronic device can receive various input operations under a keyless structure.

In addition, according to various example embodiments, by supporting active key mapping according to various input forms, user's convenience can be provided.

In addition, according to various example embodiments, by providing an electronic device of a keyless structure, a physical key indicator can be minimized, reduced or deleted, such that esthetic features can be enhanced from a design perspective.

The effects achieved by the disclosure is not limited to those mentioned above, and other effects that are not mentioned above may be clearly understood to those skilled in the art based on the description provided herein.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

With regard to the description of the drawings, the same or similar reference numerals may be used to refer to the same or similar elements.

DETAILED DESCRIPTION

Hereinafter, various example embodiments will be described in greater detail with reference to the accompanying drawings.

Figure 1:
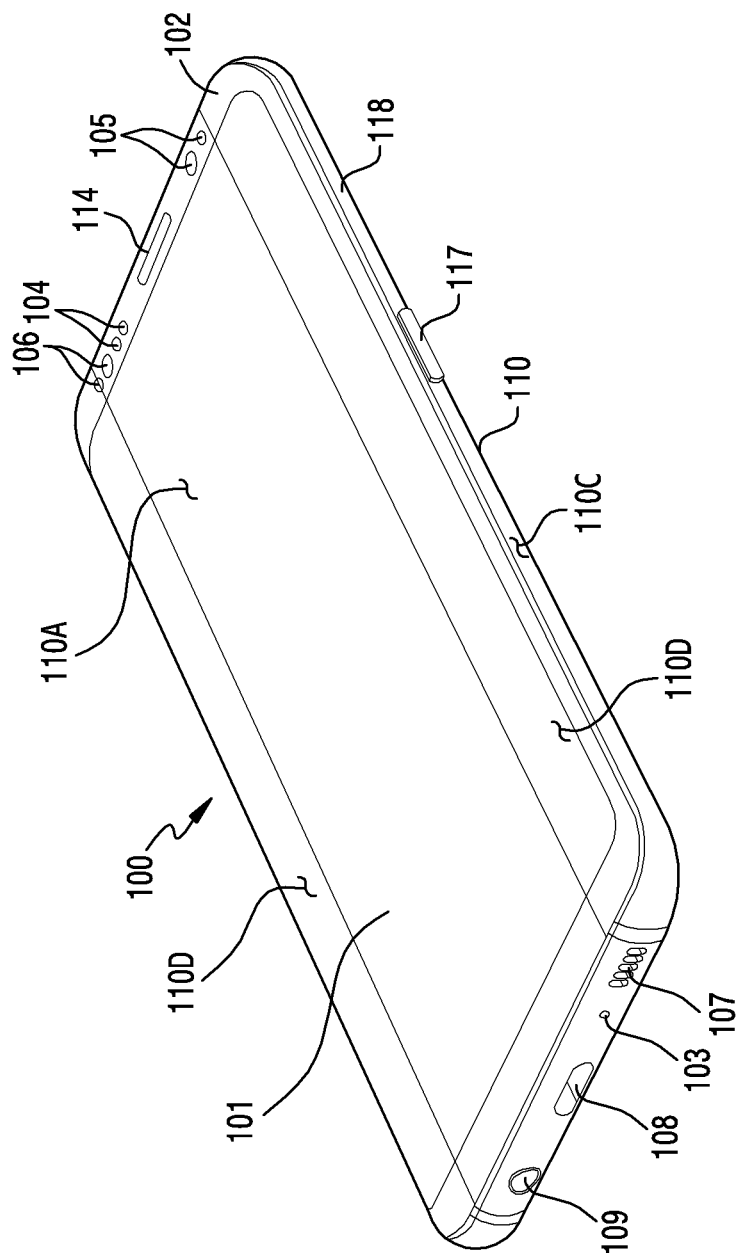
FIG. 1 is a front perspective view illustrating a front side of an example mobile electronic device according to various embodiments.
Figure 2:
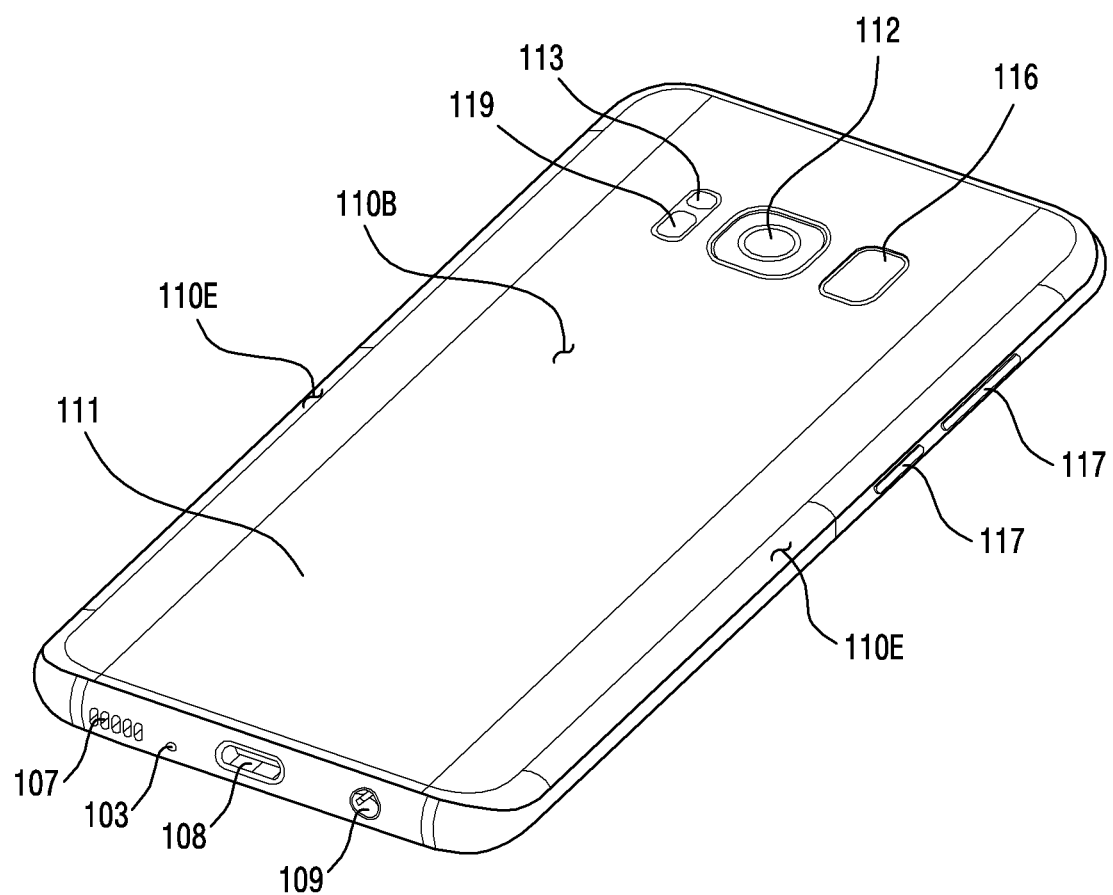
FIG. 2 is a rear perspective view illustrating a back side of an example electronic device of FIG. 1 according to various embodiments.

FIG. 1 is a front perspective view illustrating an example mobile electronic device according to various embodiments. FIG. 2 is a rear perspective view illustrating an example mobile electronic device of FIG. 1.

Referring to FIG. 1 and FIG. 2, an electronic device 100 according to an embodiment may include a housing 110 including a first side (or a front side) 110A, a second side (or a rear side) 110B, and a lateral side (surface) 110C surrounding a space between the first side 100A and the second side 110B. In an embodiment (not shown), the housing may refer, for example, to a structure which includes part of the first side 110A, second side 110B, and third side 110C of FIG. 1. According to an embodiment, the first side 110A may be constructed of a front plate 102 (or a front cover) (e.g., a polymer plate or a glass plate having various coating layers) which is at least partially transparent.

The second side 110B may be constructed of a rear plate 111 (or a rear cover) which may be opaque. For example, the rear plate 111 may be constructed, for example, and without limitation, of coated or colored glass, ceramic, polymer, metallic materials (e.g. aluminum, stainless steel (STS), or magnesium), a combination of at least two of these materials, or the like.

The lateral side 110C (or a side member or side surface) may be constructed of a lateral bezel structure (or a lateral member) 118 bonded to the front plate 102 and the rear plate 111 and including, for example, and without limitation, metal and/or polymer. In some embodiments, the rear plate 111 and the lateral bezel structure 118 may be constructed integrally and may include the same material (e.g., a metallic material such as aluminum).

In the illustrated embodiment, the front plate 102 may include a first region 110D that bends from the first side 110A toward the rear plate and extends seamlessly, at both end of a long edge of the front plate. In the illustrated embodiment (referring FIG. 2), the rear plate 111 may include a second region 110E that extends from the second side 110B toward the front plate and extends seamlessly, at both ends of the long edge. In various example embodiments, the front plate or the rear plate may comprise only one of the first region or the second region. In various example embodiments, the front plate 102 does not include a first region and a second region, and may include only a flat plane disposed in parallel with the second side 110B. In the above embodiments, as viewed from the side of the electronic device, the lateral bezel structure has a first thickness (or width) on the side where the first region or the second region is not included, and a second thickness that is thinner than the first thickness on the side including the first region or the second region.

According to an embodiment, the electronic device 100 may include, for example, and without limitation, at least one or more of a display 101, an input device 103, audio output devices 107, and 114, sensor modules 104, 119, camera modules 105, 112, and 113, and key input devices 116 and 117, an indicator 106, and connector holes 108 and 109. In various example embodiments, the electronic device 100 may omit at least one (e.g., the key input devices 116 and 117 or the indicator 106) of these components or may additionally include other components.

The display 101 may be viewable through, for example, some portions of the front plate 102. In an example embodiment, A portion of the display 101 may be viewable through the front plate 102 forming the first side 110A and the first region 110D of the lateral side 110C. The display 101 may be disposed adjacent to or bonded to, for example, and without limitation, a touch sensing circuit, a pressure sensor capable of measuring touch strength (pressure), and/or a digitizer for detecting a stylus pen of a magnetic field type. In an example embodiment, at least portion of the sensor modules 104, 119 and/or at least portion of the key input devices are disposed on the first portion 110D and/or the second portion 110E.

The audio modules 103, 107, and 114 may include a microphone hole 103 and speaker holes 107 and 114. A microphone for acquiring external sound may be disposed inside the microphone hole 103. In some embodiments, a plurality of microphones may be disposed to sense a direction of the sound. The speaker holes 107 and 114 may include the external speaker hole 107 and the receiver hole 114 for a call. In some embodiments, the speaker holes 107 and 114 and the microphone hole 103 may be implemented as a single hole, or a speaker (e.g., a piezo speaker) may be included without the speaker holes 107 and 114.

The input device 103 may include a microphone 103. In an example embodiment, the input device 103 may have a plurality of microphones disposed to sense a sound direction. The audio output device 107 and 114 may include speakers 107, 114. The speakers 107 and 114 may include the external speaker 107 and the communication receiver 114. In some embodiments, the microphone 103, the speakers 107 and 14, and the connectors 108 and 109 may be exposed through at least one hole formed in the housing 110. In an example embodiment, the hole formed in the housing may be used in common for the microphone 103 and the speakers 107 and 114. In an example embodiment, the audio output device 107 and 114 may include the speaker (e.g., a piezo speaker) that is operated except for the holes formed in the housing 110.

The sensor modules 104 and 119 may generate an electrical signal or data value corresponding to an internal operating state of the electronic device 100 or an external environmental state. The sensor modules 104 and 119 may include, for example, the first sensor module 104 (e.g., a proximity sensor) and/or second sensor module (not shown) (e.g., a fingerprint sensor) disposed to the first side 110A of the housing 110, and/or the third sensor module 119 (e.g., an HRM sensor) disposed to the second side 110B of the housing 110. The fingerprint sensor may be disposed to a portion of the first side 110A (e.g., a home key button) or the second side 110B of the housing or below the display 101. The electronic device 100 may further include at least one of a sensor module (not shown), for example, and without limitation, a gesture sensor, a gyro sensor, an atmospheric pressure sensor, a magnetic sensor, an acceleration sensor, a grip sensor, a color sensor, an Infrared (IR) sensor, a biometric sensor, a temperature sensor, a humidity sensor, an illumination sensor 104, or the like.

The camera modules 105, 112, and 113 may include the first camera device 105 disposed to the first side 110A of the electronic device 100, the second camera device 112 disposed to the second side 110B, and/or the flash 113. The camera modules 105 and 112 may include one or more lenses, an image sensor, and/or an image signal processor. The flash 113 may include, for example, and without limitation, a Light Emitting Diode (LED), a xenon lamp, or the like. In some embodiments, two or more lenses (wide angle and telephoto lenses) and image sensors may be disposed to one side of the electronic device 100.

The key input devices 116, and 117 may include the home key button disposed to the first side 110A of the housing 110, the touch pad 116 disposed around the home key button, and/or the side key button 117 disposed to the lateral side 110C of the housing 110. In an embodiment, the electronic device 100 may not include some or all of the aforementioned key input devices 116, and 117. The key input devices 116, and 117, which are not included, may be implemented using a soft key displayed on the display 101 or a in a pressure sensor included in the display 101.

The indicator 106 may be disposed to, for example, the first side 110A of the housing 110. The indicator 106 may provide, for example, state information of the electronic device 100 in an optical form and may include an LED (light emitting diode).

The connector holes 108 and 109 may include the first connector hole 108 capable of accommodating a connector (e.g., a USB connector) for transmitting/receiving power and/or data of an external electronic device and/or the second connector hole or earphone jack 109 capable of accommodating a connector for transmitting/receiving an audio signal with respect to the external electronic device.

Figure 3:
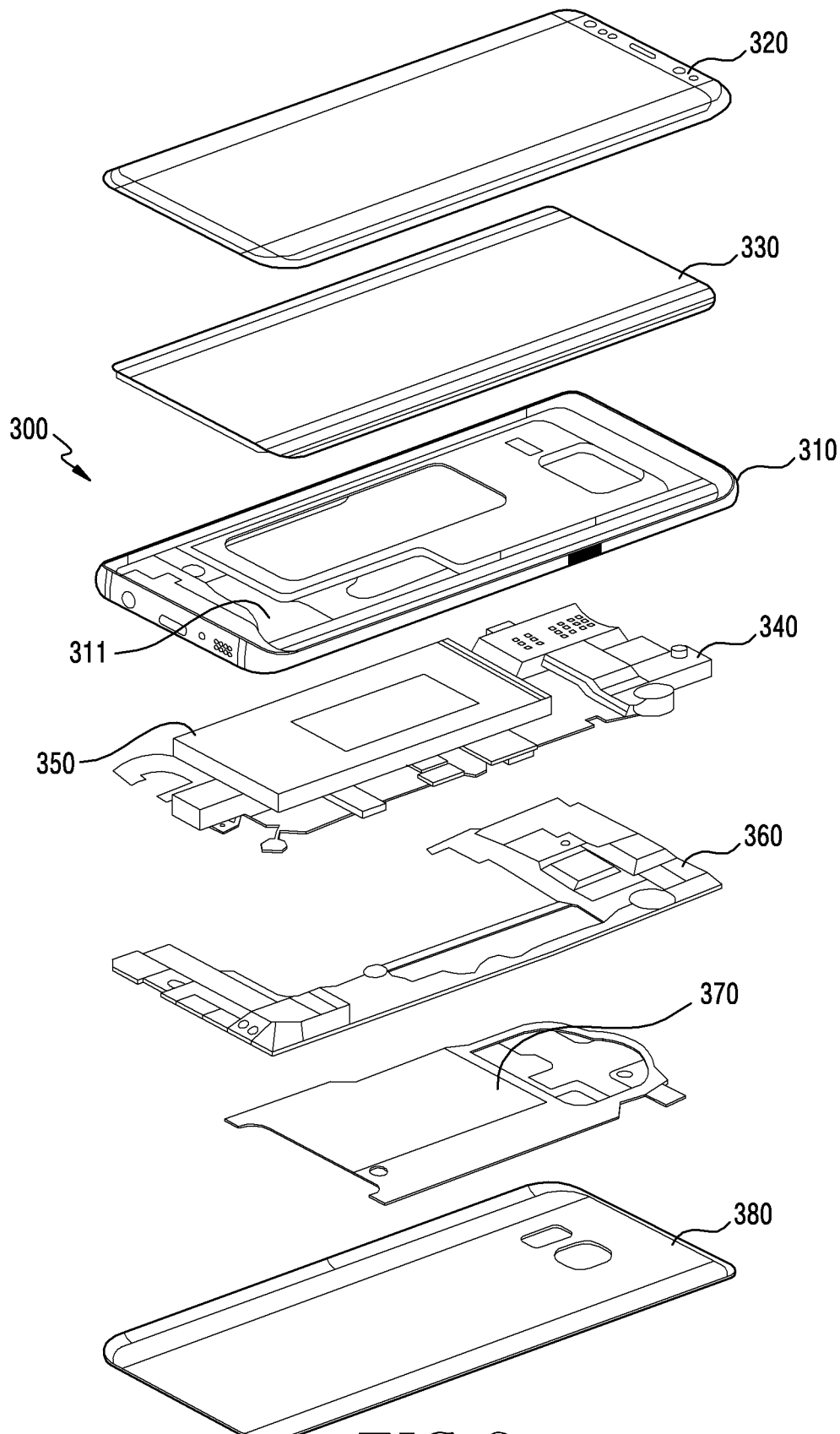
FIG. 3 is an exploded perspective view illustrating an example electronic device of FIG. 1 according to various embodiments.

FIG. 3 is an exploded perspective view illustrating an example electronic device of FIG. 1 according to various embodiments.

Referring to FIG. 3, an electronic device 300 (e.g., the electronic device (100) of FIG. 1 or FIG. 2) may include a lateral bezel structure 310, a first support member 311 (e.g., a bracket), a front plate 320, a display 330, a printed circuit board 340, a battery 350, a second support member 360 (e.g., a rear case), an antenna 370, and a rear plate 380. In some embodiments, the electronic device 300 may omit at least one (e.g., the first support member 311) of these components, or may additionally include other components. At least one of the components of the electronic device 300 may be the same as or similar to at least one of the components of the electronic device 100 of FIG. 1 or FIG. 2, and redundant descriptions will not be repeated here.

The first support member 311 may be coupled with the lateral bezel structure 310 by being disposed inside the electronic device 300 or may be constructed integrally with respect to the lateral bezel structure 310. The first support member 311 may be constructed of, for example, and without limitation, a metal material and/or non-metal material (e.g., polymer), or the like. The display 330 may be bonded to one side of the first support member 311, and the printed circuit board 340 may be bonded to the other side thereof. A processor, a memory, and/or an interface may be mounted on the printed circuit board 340. The processor may include various processing circuitry, such as, for example, and without limitation, one or more of a central processing unit, an application processor, a graphic processing unit, an image signal processor, a sensor hub processor, a communication processor, or the like.

The memory may include, for example, a volatile memory or a non-volatile memory.

The interface may include, for example, and without limitation, a High Definition Multimedia Interface (HDMI), a Universal Serial Bus (USB) interface, a Secure Digital (SD) card interface, an audio interface, or the like. For example, the interface may electrically or physically couple the electronic device 300 and the external electronic device, and may include a USB connector, an SD card/MMC connector, or an audio connector.

As a device for supplying power to at least one component of the electronic device 300, the battery 350 may include, for example, and without limitation, a non-rechargeable primary cell, a rechargeable secondary cell, a fuel cell, or the like. At least one portion of the battery 350 may be disposed on the same plane substantially with respect to, for example, the printed circuit board 340. The battery 350 may be disposed integrally inside the electronic device 100, or may be detachably disposed with respect to the electronic device 300.

The antenna 370 may be disposed between the rear plate 380 and the battery 350. The antenna 370 may include, for example, and without limitation, a Near Field Communication (NFC) antenna, a wireless charging antenna, a Magnetic Secure Transmission (MST) antenna, or the like. The antenna 370 may perform short-range communication, for example, with the external electronic device, or may wirelessly transmit/receive the power required for charging. In an embodiment, an antenna structure may be constructed by at least part of the lateral bezel structure 310 and/or the first support member 311 or a combination thereof.

Figure 4:
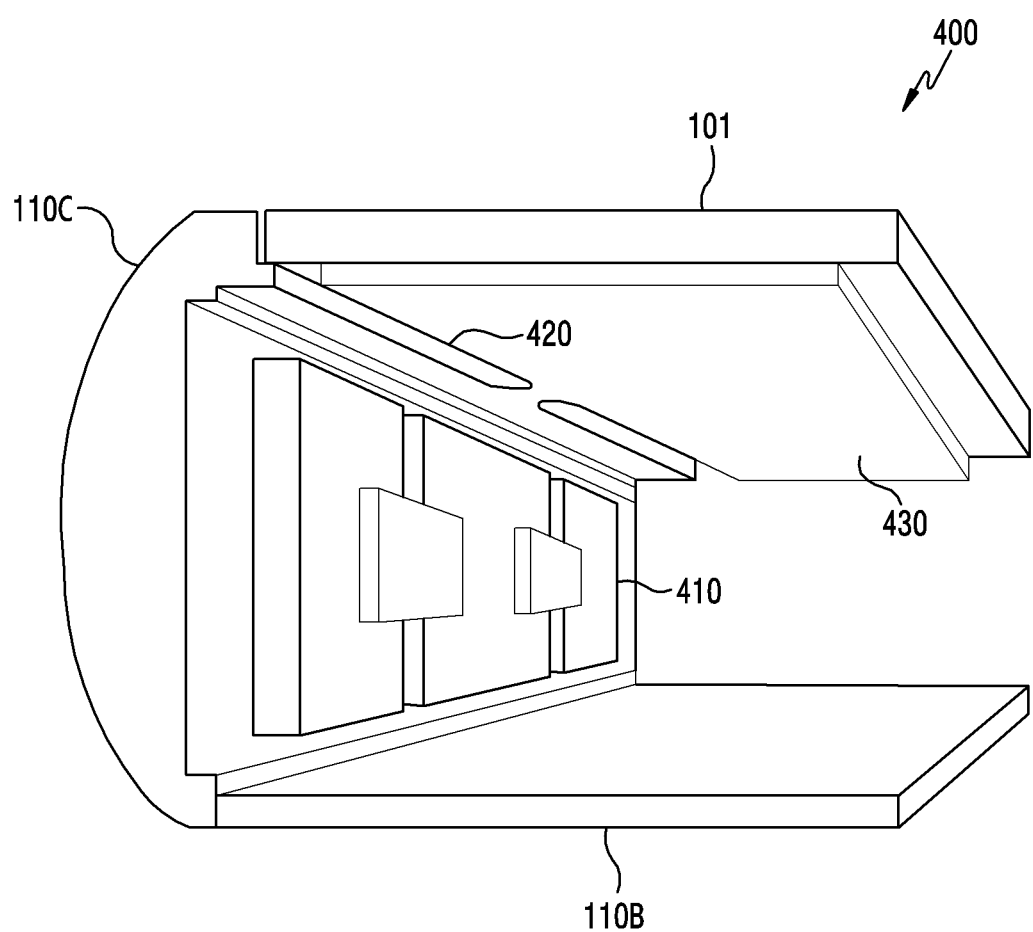
FIG. 4 is a diagram illustrating an example structure of an electronic device including a sensor block for receiving an input according to various embodiments.

FIG. 4 is a perspective view 400 illustrating an example structure of an electronic device including a sensor block (e.g., including at least one sensor) 410 for receiving an input (e.g., a user input) according to various embodiments. The sensor block of FIG. 4 may be different from the sensor modules 104, 116, 119 illustrated in FIGS. 1 and 2.

Referring to FIG. 4, the sensor block 410 for receiving a user's input may be disposed on a side surface 110C of a housing of the electronic device (for example, the electronic device 100 of FIG. 1) to detect a user's input operation such as a push, swiping, a grip. The sensor block 410 may detect a user's input by detecting a change in pressure, a time during which a touch is held, or a change in capacitance, based on a deformation of the side surface 110C of the housing caused, for example, by a push, swiping, a grip.

According to various embodiments, the sensor block 410 may include, for example, and without limitation, a strain gauge sensor, a force sensor, a pressure sensor, an ultrasonic sensor and/or a capacitance sensor, or the like, to detect a user's input operation. The strain gauge sensor may detect a degree of pushing based on a degree of change of a strain gauge caused by a deformation of the side surface 110c of the housing, the force sensor or the pressure sensor may measure a pushing force or a pressure produced by a deformation of the side surface 110C of the housing, and the capacitance sensor may detect a degree of deformation of the side surface 110c of the housing, based on a change value of capacitance changing according to a degree of deformation of the side surface 110C of the housing. Although the disclosure will be described using the strain gauge sensor hereinbelow, it is apparent that a sensor for detecting a user's input may be used on another side surface 110C of the housing including a force sensor, a pressure sensor, an ultrasonic sensor, a capacitance sensor, or a combination of various sensors, instead of the strain gauge sensor.

Referring to FIG. 4, the electronic device 100 according to various embodiments may include a structure of a slit 420 disposed on a lower portion of a display (for example, the display 101 of FIG. 1) to efficiently transmit a deformation of the side surface 110C of the housing, caused by a user's push, to the sensor block 410. If the side surface 110C of the housing is directly attached to an inner fixing structure 430 without the slit 420, a deformation of the side surface 110C of the housing caused by a user's push may not be large due to the inner fixing structure 430. A force produced by the user's push may not be transmitted to the inner fixing structure 430 due to the slit 420, and may contribute to a deformation of the side surface 110C of the housing and may concentrate a pressure caused by the user's push on the sensor block 410. However, the slit 420 may be required in the case of the strain gauge sensor, but the slit 420 may be omitted according to a type of a sensor.

According to various embodiments, the sensor block 410 may be provided on one side surface of the housing, but according to an embodiment, the sensor block 410 may be provided on both side surfaces of the housing. In addition, the sensor block 410 may be provided on only a portion of the side surface 110C of the housing, but according to an embodiment, the sensor block 410 may be provided on most of the side surface 110C of the housing.

According to various embodiments, a plurality of separated sensor blocks 410 may be provided on one side surface of the housing. According to an embodiment, a separate function or key may be mapped onto each of the sensor blocks 410, and according to an embodiment, the plurality of separated sensor blocks 410 may be combined and one function or key may be mapped onto a combination of the sensor blocks 410.

Figure 5A:
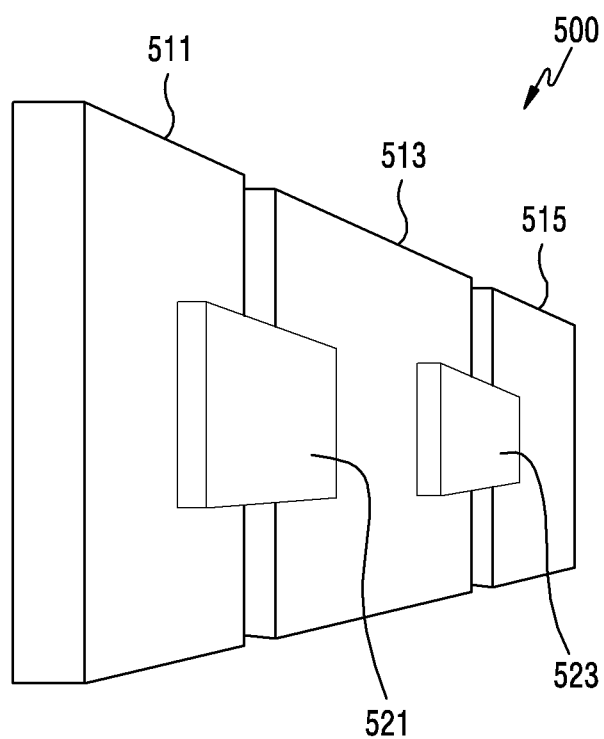
FIG. 5A is a perspective view illustrating an example sensor block structure according to various embodiments.
Figure 5B:
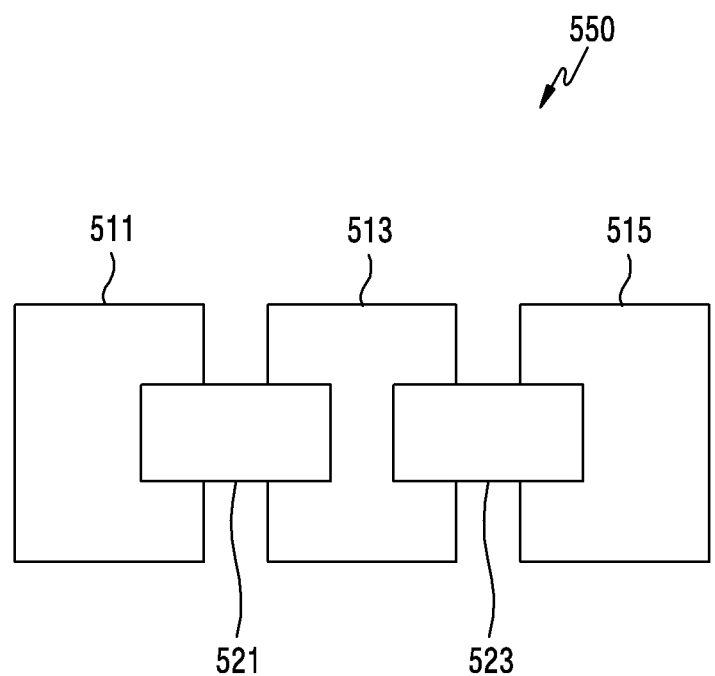
FIG. 5B and FIG. 5C are diagrams illustrating a front view of example sensor block structures according to various embodiments.
Figure 5C:
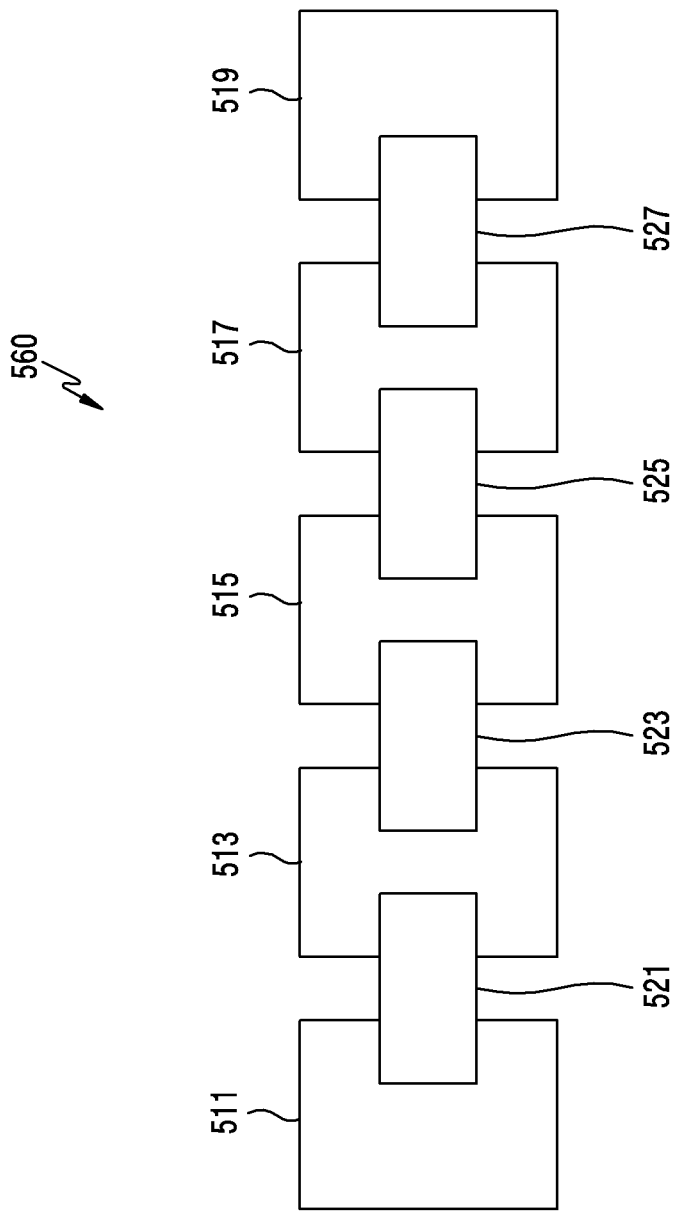

FIG. 5A is a perspective view 500 of an example structure of a sensor block (for example, the sensor block 410 of FIG. 4) according to various embodiments, and FIG. 5B and FIG. 5C are diagrams 550 illustrating example structures of the sensor block 410 according to various embodiments.

Referring to FIGS. 5A, 5B, and 5C, the sensor block 410 (illustrated as sensor blocks 500, 550 and 560 in FIGS. 5A, 5B and 5C) according to various embodiments may include N segments 511, 513, 515, 517, and/or 519 and N−1 sensors 521, 523, 525 and/or 527. Herein, the N segments 511, 513, 515, 517, or 519 may set an area for sensing a user's input, and the sensor 521, 523, 525, 527 may include a strain gauge sensor, but this should not be considered as limiting, and the sensor may be any appropriate sensor including, for example, and without limitation, a force sensor, a pressure sensor, an ultrasonic sensor, a capacitance sensor, or the like.

According to various embodiments, the sensor block 410 may include at least two segments and at least one sensor, and the number of segments and the number of sensors may be changed based, for example, on an area for sensing a user's input on the side surface 110C of the housing.

Referring to FIGS. 5A, 5B, and 5C, an air gap may be formed or a dielectric may be injected between the two segments, and one sensor may be connected to the two segments, such that a deformation of the side surface 110C of the housing collected by the two segments is transmitted to the connected sensor. As shown in the structure of FIG. 4, the segments may be provided in close contact with the side surface 110C of the housing, and may transmit a deformation of the side surface 110C of the housing caused by a weak grip, a strong grip, a pushing operation or a swiping operation of the user to the sensors.

Figure 6:
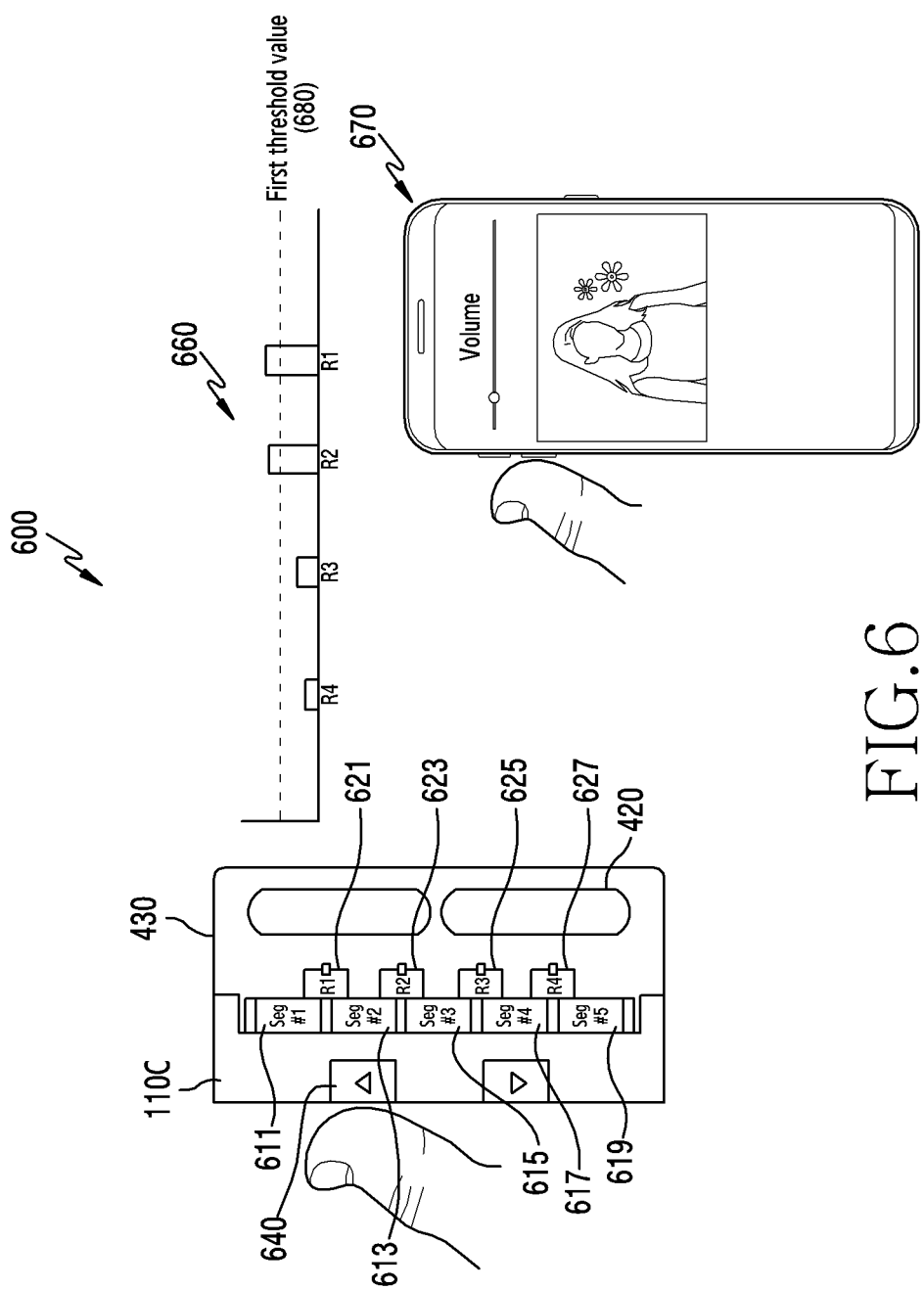
FIG. 6 is a diagram illustrating example output values of sensors in a sensor block generated by a pushing operation according to various embodiments.

FIG. 6 is a diagram 600 illustrating example output values of sensors 621, 623, 625, 627 in the sensor block 410 generated by a user's pushing operation according to various embodiments.

Referring to FIG. 6, the sensor block (for example, the sensor block 410 of FIG. 4) may include five segments 611, 613, 615, 617 and/or 619 and four sensors 621, 623, 625, 627. In an embodiment, when a user pushes a portion of an indicator 640 indicating volume up, a deformation may occur on the side surface 110C of the housing due to a pushing force, and the deformation may be transmitted to the segments 611, 613, 615, 617, and/or 619 of the sensor block 410. In this case, a larger deformation may occur on a portion that is close to the pushed portion of the side surface 110C of the housing, and a smaller deformation may occur on a portion that is far from the pushed portion. Accordingly, the segments 611, 613 which are close to the pushed portion may be more pushed, whereas the segments 617, 619 which are far from the pushed portion may be less pushed. As a result, a relatively strong force may be exerted to the sensors 621, 623 which are close to the pushed portion, and accordingly, deformation of the sensors 621, 623 may be large and an output value proportional to the deformation may increase. On the other hand, a relatively weak force may be exerted to the sensors 625, 627 which are far from the pushed portion, and accordingly, deformation of the sensors 625, 627 may be relatively small and an output value may be reduced. Accordingly, the electronic device (for example, the electronic device 100 of FIG. 1) may determine which portion of the side surface 110C of the housing is pushed or whether a specific indicator portion is pushed, based on output values 660 of the sensors 621, 623, 625, 627 included in the sensor block 410. In the embodiment of FIG. 6, when the output values of the sensor 621 and the sensor 623 are greater than a pre-set threshold value 680, and the output values of the sensor 625 and the sensor 627 are less than the pre-set threshold value, the electronic device 100 may determine that the volume-up indicator portion is pushed, and as a result, may perform an operation of turning up the volume of the electronic device 100 and may display the operation on a screen (670). The value output from the sensor 621, 623, 625, 627 may include, for example a resistance value that is proportional to a degree of deformation of the sensor, or may be another value corresponding thereto. In an embodiment, the value of the sensor may be a current or a voltage.

Figure 7:
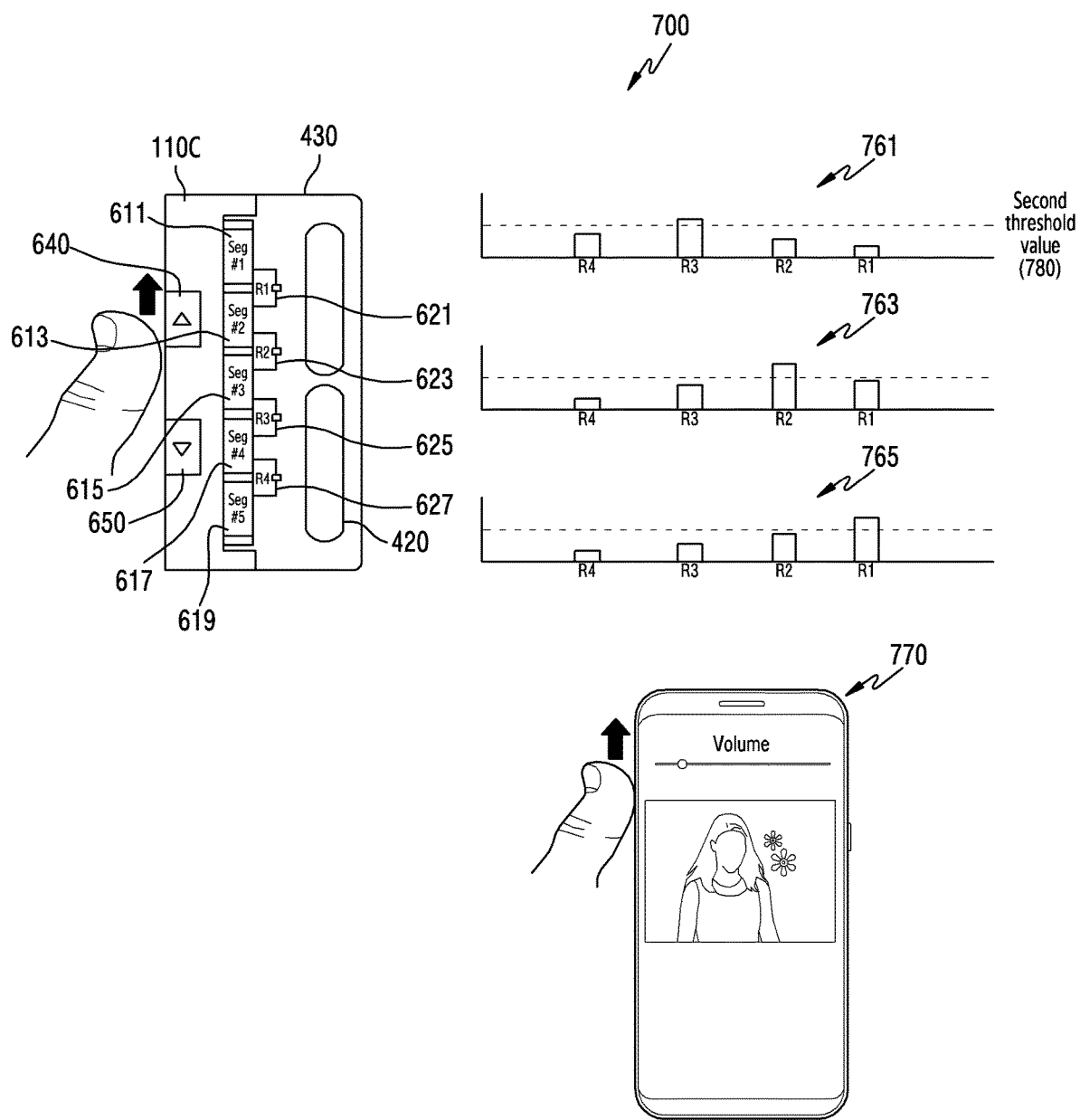
FIG. 7 is a diagram illustrating example output values of sensors in a sensor block generated by a swiping operation according to various embodiments.

FIG. 7 is a diagram 700 illustrating example output values of sensors 621, 623, 625, 627 in the sensor block 410 generated by a user's swiping operation according to various embodiments.

Referring to FIG. 7, the sensor block (for example, the sensor block 410 of FIG. 4) according to an embodiment may include five segments 611, 613, 615, 617 and/or 619 and four sensors 621, 623, 625, 627. In an embodiment, a user may swipe from a portion where an indicator 650 indicating volume down is displayed to a portion where an indicator 640 indicating volume up is displayed. A deformation may occur on the side surface 110C of the housing due to the user's swiping operation, and the deformation may be transmitted to the segments 611, 613, 615, 617, and/or 619 of the sensor block 410. In this case, portions deformed by the swiping operation on the side surface 110C of the housing may be different at the start of the swiping and at the end of the swiping.

In an embodiment, at the start of the swiping, the portion of the volume-down indicator 650 may undergo a large deformation, and accordingly, the segments 617, 619 which are close to the portion of the volume-down indicator 650 may be subjected to a relatively strong force, and the segments 611, 613 which are far from the portion of the volume-down indicator 650 may be subjected to a relatively weak force. As a result, a relatively strong force may be exerted to the sensors 625, 627, and deformation of the sensors 625, 627 may be large and output values proportional to the deformation may increase. On the other hand, a relatively weak force may be exerted to the sensors 621, 623, and accordingly, deformation of the sensors 621, 623 may be relatively small and output values may be reduced. Accordingly, the electronic device (for example, the electronic device 100 of FIG. 1) may acquire output values 761 of the sensors 621, 623, 625, 627. At the end of the swiping, a deformation of the portion of the volume-up indicator 640 may be large, and accordingly, the segment 613 which is close to the portion of the volume-up indicator 640 may be subjected to a relatively strong force, and the segments 617, 619 which are far from the portion of the volume-up indicator 640 may be subjected to a relatively weak force. As a result, a relatively strong force may be exerted to the sensor 621, and a deformation of the sensor 621 may be large and the output value proportional to the deformation may increase. On the other hand, a relatively weak force may be exerted to the sensors 625, 627, and accordingly, deformation of the sensors 625, 627 may be relatively small and the output values may be reduced. Accordingly, the electronic device 100 may acquire output values 765 of the sensors 621, 623, 625, 627.

According to various embodiments, it can be seen from FIG. 7 that the electronic device 100 may have the output values 761, 763, 765 of the sensors 621, 623, 625, 627 changing from the start of the swiping until the end of the swiping during the user's swiping operation. According to an embodiment, the electronic device 100 may not only determine that the swiping operation is inputted, but also may know a position of the start of the swiping and a position of the end of the swiping, based on the changing output values 761, 763, 765 of the sensors 621, 623, 625, 627. In an embodiment, when the output value of the sensor 625 exceeds a threshold value (e.g., second threshold value 780) as indicated in the graph 761 of FIG. 7, the electronic device 100 may determine that the user's swiping starts at the position of the volume-down indicator 650, and, when the output value of the sensor 621 exceeds the threshold value as indicated in the graph 765 of FIG. 7, the electronic device 100 may determine that the user's swiping ends at the position of the volume-up indicator 640. When output values of sensors (for example, the sensors 621 and 623) exceed the threshold value at the end of the swiping, it may be determined that the swiping ends at a middle portion between positions corresponding to the sensors (for example, the sensors 621 and 623), although this is not illustrated. In an embodiment, a final swiping end position may be determined based real output values, regardless of whether the output values of the sensors (for example, the sensors 621 and 623) exceed the threshold value.

According to various embodiments, the user's swiping operation may be mapped onto various functions. As shown in a view 770 of FIG. 7, the user's swiping operation may be mapped onto a volume-up function. For example, swiping from the volume-down indicator 650 to the volume-up indicator 640 may be mapped onto the volume-up function. In this case, the volume may be set to increase by the same level by a single swiping operation, or may be set to increase in proportion to a swiping distance. In an embodiment, swiping from the volume-up indicator 640 to the volume-down indicator 650 may be mapped onto a volume-down function. In this case, the volume may be set to decrease by the same level by a single swiping operation, or may be set to decrease in proportion to a swiping distance. According to an embodiment, the level by which the volume increases or decreases may be set based on an intensity of pressure at the end of the swiping, or an input holding time.

According to various embodiments, the threshold values applied to the user's pushing operation shown in FIG. 6 and the user's swiping operation shown in FIG. 7 may be different from each other. Since it is common that a user uses a smaller force in performing a swiping operation than in performing a pushing operation, the electronic device 100 may set the threshold value for the swiping operation to be less than the threshold value for the pushing operation.

According to various embodiments, although it is illustrated in FIGS. 6 and 7 that the volume-up indicator 640 and the volume-down indicator 650 are displayed on the side surface 110C of the housing for convenience of explanation, the volume-up indicator 640 and the volume-down indicator 650 may be deleted in a keyless structure. In this case, the electronic device 100 may determine whether a pushing operation is performed on a specific position or an upward or downward swiping operation is performed, based on output values of the sensors (for example, the sensors 621, 623, 625, 627), and, if there is a swiping operation, the electronic device 100 may determine where a start position and an end position of the swiping operation are. In addition, the electronic device 100 may map the user's pushing operation and/or swiping operation onto a function of the electronic device (for example, a volume-up function, a volume-down function, a power on/off function, a Bixby execution function), and may use the functions. According to an embodiment, a function mapped onto a specific operation may be temporarily maintained and may be disabled after a predetermined time is elapsed.

Figure 8:
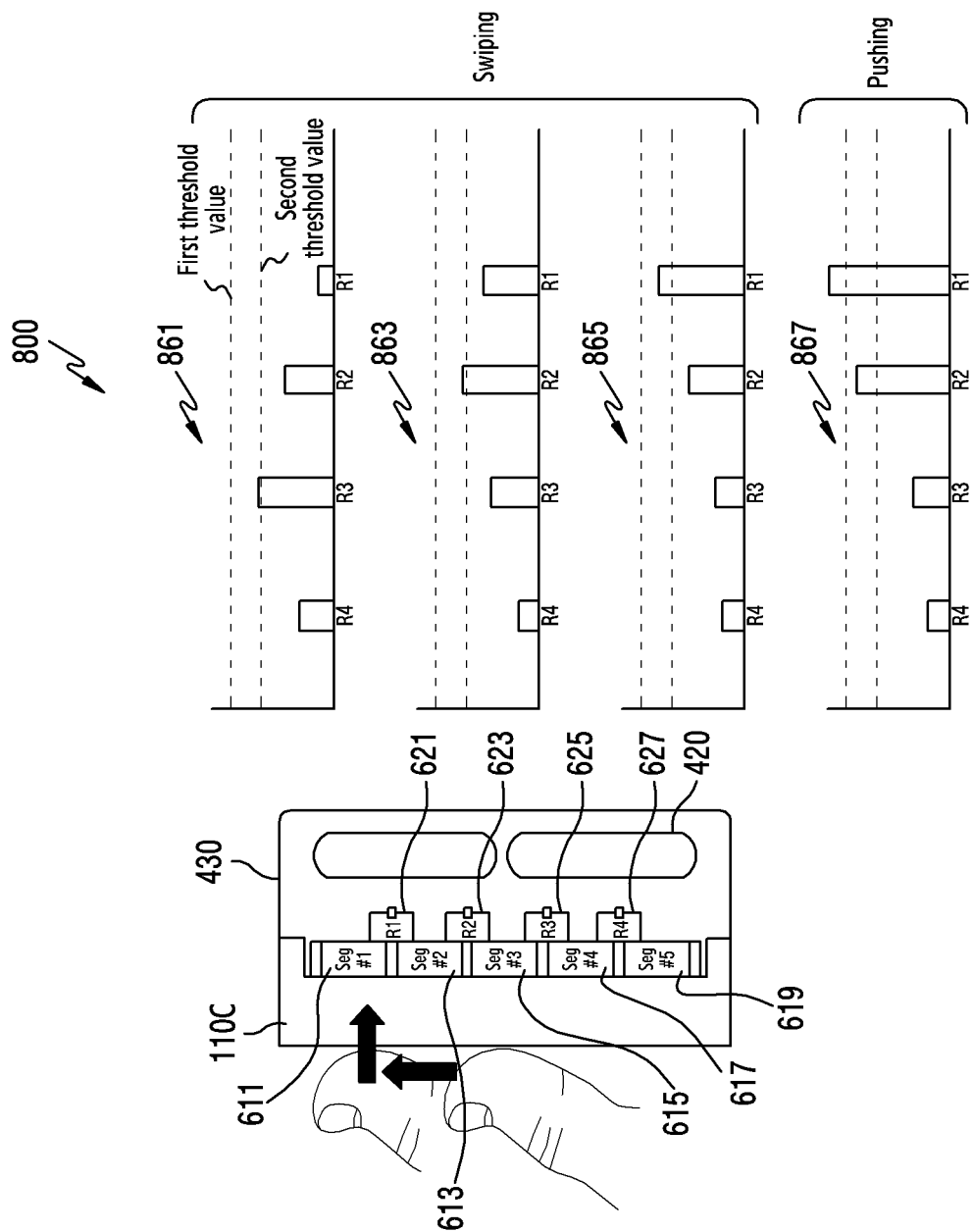
FIG. 8 is a diagram illustrating example output values of sensors in a sensor block generated by an operation of pushing after swiping according to various embodiments.

FIG. 8 is a diagram 800 illustrating example output values of sensors 621, 623, 625, 627 in the sensor block 410 generated by a user's operation of pushing after swiping according to various embodiments.

Referring to FIG. 8, the sensor block (for example, the sensor block 410 of FIG. 4) according to an embodiment may include five segments 611, 613, 615, 617, and/or 619 and four sensors 621, 623, 625, 627. In an embodiment, the user may perform an operation of pushing after swiping, which starts swiping at a first position and finishes swiping and pushes at a second position. The side surface 110C of the housing may be deformed by the user's operation of pushing after swiping, and such a deformation may be transmitted to the segments 611, 613, 615, 617 and/or 619 of the sensor block 410. In addition, output values of the sensors 621, 623, 625, 627 may be changed by the segments 611, 613, 615, 617, and/or 619 being pushed by the deformation of the side surface 110C of the housing. As a result, resulting output values 861, 863, 865, 867 of the sensors shown in FIG. 8 may be generated with time.

According to various embodiments, the electronic device (for example, the electronic device 100 of FIG. 1) may identify the user's operation of pushing after swiping, based on the resulting output values 861, 863, 865, 867 of the sensors illustrated in FIG. 8. In an embodiment, referring to the output values 861, 863, 865 of the sensors illustrated in FIG. 8, the electronic device may recognize that swiping is performed from the sensor 625 to the sensor 621, by recognizing that the output value of the sensor 625 is greater than a threshold value (second threshold value) for swiping at the start (861), the output value of the sensor 625 decreases and the output value of the sensor 623 becomes greater than the second threshold value (863) as time is elapsed, and finally, the output value of the sensor 621 is greater than the second threshold value. In addition, the electronic device 100 may recognize that a user's pushing operation is performed at a position of the sensor 621 as the output value of the sensor 621 is greater than a threshold value for pushing (first threshold value) (867). As described above, the electronic device 100 may identify that the user's operation of pushing after swiping is performed, based on the change in the output values of the sensors 621, 623, 625, 627. In addition, the electronic device 100 may recognize that, after the swiping operation starting at a position corresponding to the sensor 625 and finishing at a position corresponding to the sensor 621, the pushing operation is performed at the position corresponding to the sensor 621.

According to various embodiments, the electronic device 100 may recognize a user's operation as described above, and may perform key mapping or function mapping based on the recognized operation. Referring to the embodiment of FIG. 8, when the pushing operation after the upward swiping operation from bottom to top is recognized, the electronic device 100 may map a position where the pushing operation is performed onto a volume-up key position of a volume function. According to an embodiment, when the user performs the operation of pushing after swiping and then repeats the pushing operation at the position where the pushing operation is performed, the electronic device 100 may determine that the volume-up key is continuously pushed, and may continuously turn up the volume.

According to various embodiments, the electronic device 100 may map a volume-down key position in the embodiment of FIG. 8. In an embodiment, the electronic device 100 may map the position where the swiping operation starts (for example, the position corresponding to the sensor 625) onto the volume-down key position. In an embodiment, the electronic device 100 may map a position a pre-set length lower than the volume-up key position, mapped by the user's operation of pushing after swiping, onto the volume-down key position. In an embodiment, the electronic device 100 may set the pre-set length based on a user's characteristic (for example, a size of user's hand).

The electronic device 100 according to an embodiment of FIG. 8 may map the position corresponding to the sensor 621 onto the volume-up key position and may map the position corresponding to the sensor 625 onto the volume-down key position, based on a user's operation of pushing after swiping up. According to an embodiment, when the user's operation of pushing after swiping up starts at the sensor 627 and ends at the sensor 623, and a pushing operation is performed at the sensor 623, the electronic device 100 may map the position corresponding to the sensor 623 to the volume-up key position, and may map the position corresponding to the sensor 627 to the volume-down key position.

According to an embodiment, when a user's operation of pushing after swiping down starts at the sensor 621 and ends at the sensor 627, and a pushing operation is performed at the sensor 627, the electronic device 100 may map the position corresponding to the sensor 627 to the volume-down key position, and may map the position corresponding to the sensor 621 to the volume-up key position.

According to an embodiment, when a user's operation of pushing after swiping down starts at the sensor 623 and ends at the sensor 625, and a pushing operation is performed at the sensor 625, the electronic device 100 may map the position corresponding to the sensor 625 to the volume-down key position, and may map the position corresponding to the sensor 623 to the volume-up key position.

Although it is illustrated in the embodiment of FIG. 8 that the volume-up key position and the volume-down key position are mapped onto positions changed based on the operation of pushing after swiping, the above-described mapping operation may be equally applied to an operation of swiping after pushing.

As described above, the electronic device 100 may map a key onto a variable position other than a fixed position, based on the user's operation of pushing after swiping. Accordingly, the electronic device 100 may display the mapped key position for the user through the display.

Figures 9A, 9B:
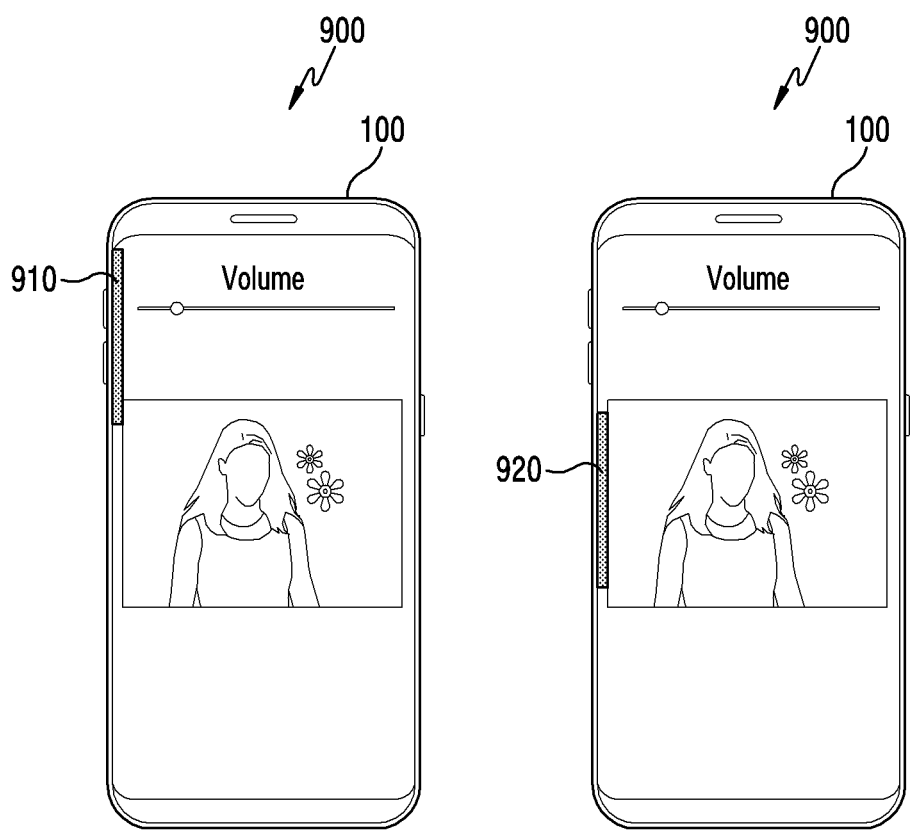
FIGS. 9A and 9B are diagrams illustrating an example of displaying a volume-up key position and a volume-down key position which are set by an operation according to various embodiments.

FIGS. 9A and 9B are diagrams 900 illustrating an example of displaying a volume-up key position and a volume-down key position which are set by a user's operation according to various embodiments.

Referring to FIG. 9A, the electronic device (for example, the electronic device 100 of FIG. 1) may recognize that a user's operation of swiping and pushing occurs on an upper portion of the electronic device 100, and may inform the user of a volume-up key position and a volume-down key position by displaying a swiping portion 910 of the electronic device 100. Referring to FIG. 9B, the electronic device 100 may recognize that a user's operation of swiping and pushing occurs on the middle of the electronic device 100, and may inform the user of a volume-up key position and a volume-down key position by displaying a swiping portion 920 of the electronic device 100.

The electronic device 100 according to an embodiment may inform the user of the volume-up key position and the volume-down key position using a method different from those illustrated in FIGS. 9A and 9B, and according to an embodiment, the electronic device 100 may inform the user of the volume-up key position and the volume-down key position by displaying a text (for example, UP or DOWN, or U or D, or up or down in Korean) or an icon (for example, ↑ and ↓ or Δ and ∇ or ▲ and ▼).

According to various embodiments, the electronic device 100 may maintain the above-described key mapping for a pre-set time. The electronic device 100 may disable the key mapping after the pre-set time is elapsed. The electronic device 100 may disable the key mapping when there is no user input on the mapped key position for the pre-set time.

Although mapping the keys related to the volume has been described in the above-described embodiments, the same or similar may be applied to mapping keys related to other functions. In an embodiment, the electronic device 100 may identify an operation of pushing after swiping on an upper portion of the side surface 110C of the housing as an operation corresponding to volume key mapping, and may identify an operation of pushing after swiping on a lower portion of the side surface 110C of the housing as an operation regarding Bixby key mapping. In an embodiment, the electronic device 100 may identify an operation of pushing after swiping up as the operation corresponding to the volume key mapping, and may identify an operation of pushing after swiping down as the operation regarding the Bixby key mapping.

According to various embodiments, the electronic device 100 may pre-set positions of a volume up/down key, a Bixby key, a power key, and may display all of the positions of the keys which are pre-set, by a user's specific operation, for example, a swiping operation or a strong grip operation. According to an embodiment, the electronic device 100 may display the positions of the keys on a display area in the proximity of the side surface corresponding to the positions of the keys, based on user experience (UX).

According to various embodiments, the electronic device 100 may map to determine which function will be executed in response to a specific operation inputted by the user. The electronic device 100 may map a specific function of the electronic device 100 onto a user's specific operation by default, and may enable the function corresponding to the user's specific function according the mapping. In addition, when a user's input operation (for example, an operation of pushing after swiping after pushing or an operation of swiping after pushing after swiping) that is not mapped onto a function of the electronic device 100 is identified, the electronic device may perform a series of operations to map the user's input operation, which is not mapped, onto one of the functions of the electronic device 100. In an embodiment, after the user's input operation that is not mapped onto a function is identified, the electronic device 100 may inquire the user about whether to map the input operation onto a function, and may map the operation onto a specific function according to user' selection. The electronic device 100 may store the result of mapping in a memory.

In the above-described examples, identifying, as an operation (e.g., a user input operation), a pushing operation and a swiping operation and a combination operation of these using output values of the sensors (for example, the sensors 621, 623, 625, 627 of FIGS. 6, 7, and 8) in the sensor block (for example, the sensor block 410 of FIG. 4) have been described, but a grip operation may be identified using output values of the sensors 621, 623, 625, 627 in the sensor block 410. In an embodiment, when a plurality of output values of the sensors 621, 623, 625, 627 in the sensor block 410 are less than the second threshold value for recognizing a swiping operation, a weak grip may be recognized. The weak grip indicates a state in which the user simply grips the electronic device without a user's intent, and may not be recognized as a user input. In an embodiment, when the plurality of output values of the sensors 621, 623, 625, 627 in the sensor block 410 are greater than the first threshold value for recognizing a pushing operation, a strong grip may be recognized. The strong grip may be an input operation including a user's intent to perform a specific function.

According to various embodiments, a user's touch operation may be combined with a user's swiping operation, pushing operation, and grip operation. The user's touch operation may be collected by a touch sensor (not shown) of the electronic device 100. In an embodiment, the user's touch operation may refer, for example, to a touch operation on the periphery of a position of a pushing operation after the user's pushing. In an embodiment, the user's touch operation may refer, for example, to a touch operation that is performed on the periphery of a start position of user's swiping before the swiping operation starts, and a touch operation that is performed on the periphery of an end position of the user's swiping after the swiping operation ends. Various user input operations may be possible by combining a user's swiping operation, pushing operation, touch operation.

Figure 10:
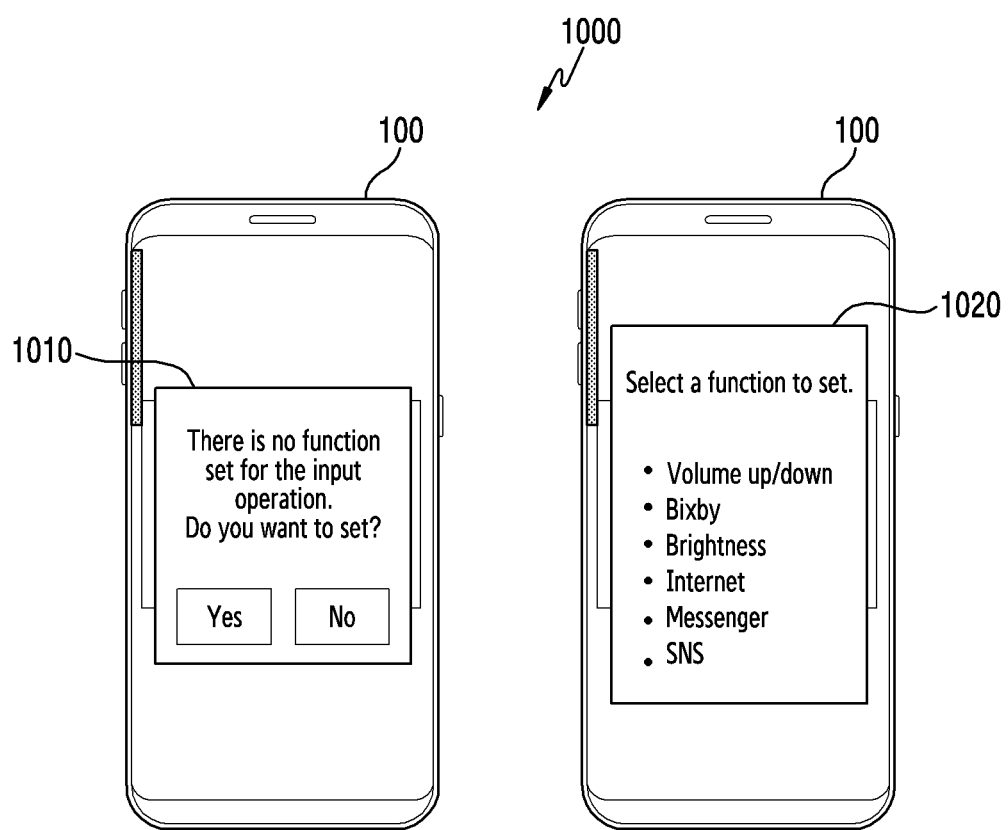
FIG. 10 is a diagram illustrating an example screen displayed by an electronic device to set a function corresponding to an input operation according to various embodiments.

FIG. 10 is a diagram 1000 illustrating an example screen displayed by an electronic device to set a function corresponding to a user's input operation according to various embodiments.

According to various embodiments, the user may input a series of operations which is a combination of a swiping operation, a pushing operation, and/or a touch operation. When there is no function of the electronic device (for example, the electronic device 100 of FIG. 1) that is set to correspond to the series of operations inputted by the user, the electronic device 100 may show the user a notification 1010 informing that there is no function corresponding to the user's input operation and inquiring about whether to set a corresponding function as shown in FIG. 10. According to an embodiment, the notification 1010 may be displayed on the screen in the form of a pop-up window. The electronic device 100 may perform a next operation to set a function or may finish according to user's selection. According to an embodiment, when the user selects "Yes", the electronic device 100 may display a notification 1020 showing settable functions on the screen. According to an embodiment, the settable functions may be displayed in the form of a text or an icon. According to an embodiment, only some of the settable functions that have high priority may be displayed according to the priority acquired by learning. In still an embodiment, the user may be allowed to select one of all applications installed in the electronic device 100.

When the user completes the selection, the electronic device 100 may match the series of operations inputted by the user and the function selected by the user, and may store the matching information in a memory as mapping information, and, when the user inputs the same series of operations afterward, the electronic device 100 may perform the corresponding function.

Figure 11:
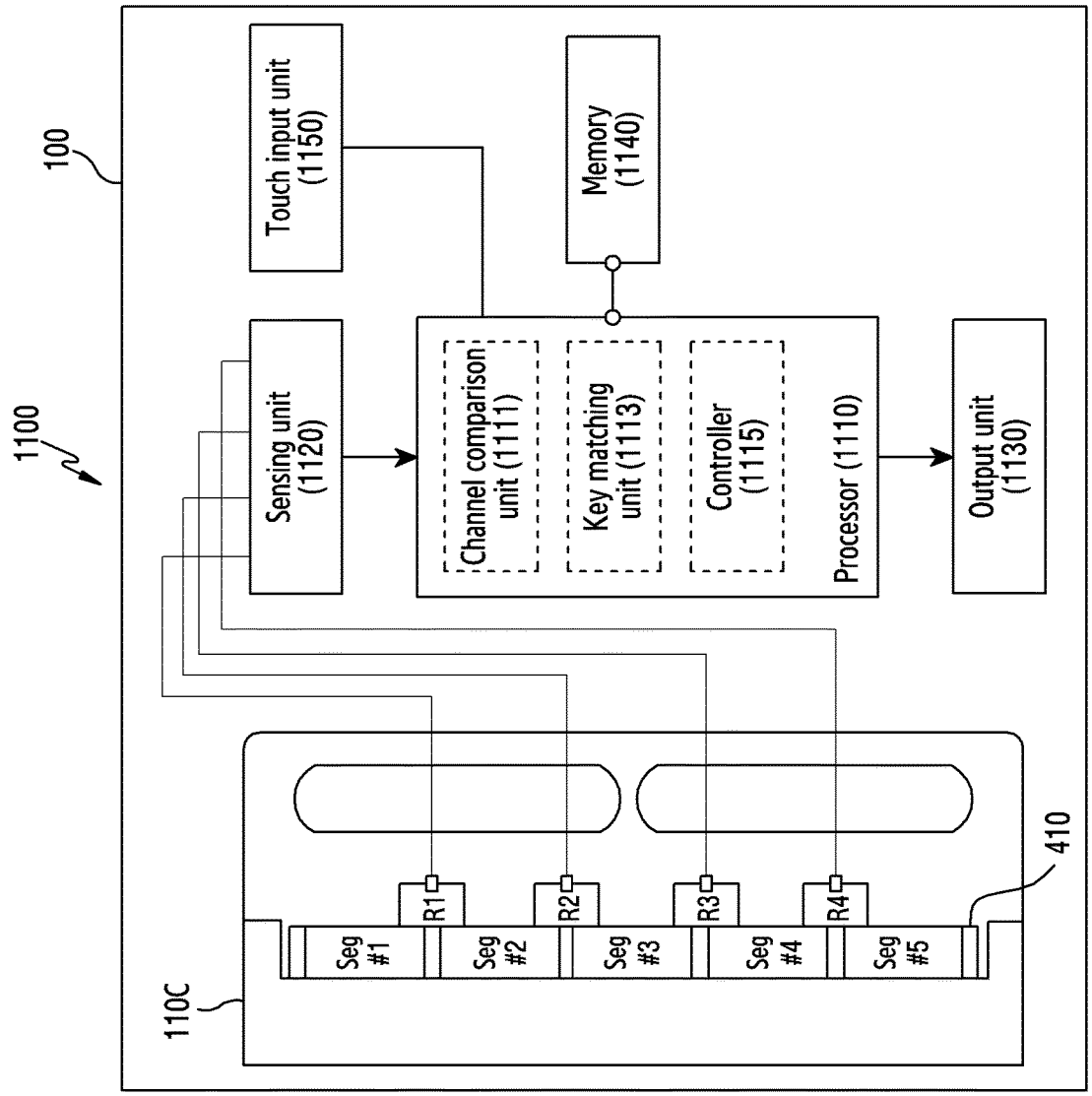
FIG. 11 is a block diagram illustrating an example configuration of an electronic device according to various embodiments.

FIG. 11 is a block diagram 1100 illustrating an example configuration of an electronic device according to various embodiments. FIG. 11 illustrates an example functional configuration of the electronic device for implementing a method according to an embodiment.

Referring to FIG. 11, the electronic device (for example, the electronic device 100 of FIG. 1) may include a processor (e.g., including processing circuitry) 1110, a sensing unit (e.g., including circuitry) 1120, an output unit (e.g., including output circuitry) 1130, a touch input unit (e.g., including touch input circuitry) 1150, and/or a memory 140. However, this should not be considered as limiting. At least one of these elements of the electronic device 100 may be omitted, or one or more other elements may be added, and functions of some of the elements may be implemented by a plurality of divided elements.

According to various embodiments, the output unit 1130 may include various output circuitry and visually provide information to the outside of the electronic device 100 (for example, a user). The output unit 1130 may include a control circuitry to control, for example, and without limitation, a display, a hologram device, a projector, or the like, and a corresponding device. According to an embodiment, the output unit 1130 may be combined with the touch input unit 1150 which includes a touch circuitry set to detect a touch or a sensor circuitry (for example, a pressure sensor) set to measure an intensity of a force generated by a touch.

According to various embodiments, the sensing unit 1120 may include various circuitry and receive an output result from sensors (for example, the sensors 621, 623, 625, 627 of FIGS. 6, 7, 8) included in the sensor block 410 provided on one side surface or both side surfaces 110C of the housing. The output result of each sensor may be a value digitizing a degree of each sensor's being pushed by the side surface of the housing. The output result may be an analogue signal like a resistance value, a current value, a voltage value. The sensing unit 1120 may include an analog-to-digital converter (ADC) to convert a received analogue value into a corresponding digital value. According to an embodiment, the sensing unit 1120 and the sensor block 410 may be integrated into a single sensor module.

According to various embodiments, the processor 1110 may include various processing circuitry and perform functions of a channel comparison unit (e.g., including various processing circuitry and/or executable program elements) 1111, a key matching unit (e.g., including various processing circuitry and/or executable program elements) 1113, and a controller (e.g., including various processing circuitry and/or executable program elements) 1115. The above-described functions may be performed in one processor 1110 or may be distributed and performed in a plurality of processors.

According to various embodiments, the channel comparison unit 1111 may include various processing circuitry and/or executable program elements and parse output values output from the sensors of the sensor block 410, which are obtained by the sensing unit 1130, according to each sensor or each time, and may determine an operation performed by the user based on the result of parsing. According to an embodiment, the channel comparison unit 1111 may identify whether a swiping operation or a pushing operation is performed, by comparing output values of the respective sensors. In addition, according to an embodiment, the channel comparison unit 1111 may identify whether the user performs a pushing operation or a swiping operation, by comparing and parsing output values of channels and a first threshold value for determining a pushing operation and/or a second threshold value for determining a swiping operation. According to an embodiment, the channel comparison unit 1111 may identify whether a swiping operation is performed by obtaining sensor information having an output value exceeding the second threshold value. When the channel comparison unit 1111 identifies that a swiping operation is performed, the channel comparison unit 1111 may identify a start position, an end position of the swiping operation. According to an embodiment, the channel comparison unit 1111 may identify whether a pushing operation is performed by obtaining sensor information having an output value exceeding the first threshold value. In addition, the channel comparison unit 1111 may identify a series of operations performed by the user, based on output values output from the sensors of the sensor block 410. In an embodiment, the channel comparison unit 111 may identify that the user performs a simple swiping operation or a simple pushing operation, or the user performs an operation of pushing after swiping, an operation of swiping after pushing, or an operation of pushing after swiping after pushing, based on output values of the sensors of the sensor block 410.

According to various embodiments, the key matching unit 1113 may include various processing circuitry and/or executable program elements and match a series of operations performed by the user, which is identified by the channel comparison unit 1111, with a function of the electronic device 100. Matching information regarding the function of the electronic device that matches the series of operations performed by the user may be stored in the memory 1140. The matching information may be pre-set and may be stored in the memory 1140 before the electronic device 100 is purchased by the user. However, the electronic device 100 may change pre-set matching information based on a user's input, and may match a new user operation that is not included in the matching information with a function of the electronic device 100.

According to various embodiments, the key matching unit 1113 may find the function corresponding to the series of operations performed by the user and received at the channel comparison unit 1111, from the matching information stored in the memory 1140. When the key matching unit 1113 finds the function corresponding to the operation performed by the user, the key matching unit 1113 may provide corresponding function information to the controller 1115 to cause the controller 1115 to perform the corresponding function. In an embodiment, the key matching unit 1113 may acquire information indicating that a function corresponding to a user's operation of pushing after swiping up is the volume-up/down key setting function, from the matching information. The key matching unit 1113 may transmit the information indicating that the function corresponding to the user's operation is the volume-up/down key setting function to the controller 1115 to cause the controller 1115 to perform the corresponding function. In this case, the key matching unit 1113 may transmit information regarding a start position of swiping, an end position of swiping, and a pushing position to the controller 1115 as parameters for setting a function.

According to various embodiments, when the key matching unit 1113 may not find the function corresponding to the series of operations performed by the user, the key matching unit 1113 may transmit a matching function setting function for matching the series of operations performed by the user and one of the functions of the electronic device 100 to the controller 1115. In this case, the key matching unit 1113 may transmit information regarding the series of operations performed by the user to the controller 1115, as a parameter for setting the function.

According to various embodiments, the controller 1115 may perform the function received from the key matching unit 1113.

According to an embodiment, when the volume-up/down key setting function is received from the key matching unit 1113, the controller 1115 may set a volume-up/down key position based on the parameters received from the key matching unit 1113. In an embodiment, when an operation of pushing after swiping up is performed by the user, the controller 1115 may receive information indicating that the volume-up/down key setting function should be performed, and may set a volume-up key at the pushing position and may set a volume-down key at a swiping start position. The position where the volume-down key is set may vary based on a length of the swiping operation, a user characteristic (for example, a size of user's hand). In addition, the controller 1115 may show the user the set position of the volume-up/down key through the output unit 1130. The user may grasp the key position by the displaying operation of the controller 1115 although there is no key display on the border of the housing.

According to an embodiment, when setting of the matching function is received from the key matching unit 1113, the controller 1115 may match a function of the electronic device 100 corresponding to the series of operations inputted by the user by interacting with the user. In an embodiment, the controller 1115 may recommend functions that may correspond to a corresponding operation, based on the operation performed by the user. In an embodiment, when it is determined that a function corresponding to a double-pushing operation is not set, the controller 1115 may recommend functions (for example, calling, web-browsing, clock, calendar, messenger, social network service (SNS)) that may correspond to the double-pushing operation by displaying the functions for the user through the output unit 1130. According to an embodiment, the controller 1115 may recommend the function that has been most frequently used by the user by giving priority to the function through learning. The controller 1115 may acquire a function corresponding to the user's operation from among the recommended functions or other functions, based on user's selection, and may match the operation inputted by the user and the function of the electronic device 100 and may add to the mapping information.

According to various embodiments, the memory 1140 may store instructions that, when executed, cause the processor 1110 to perform the functions of the channel comparison unit 1111, the key matching unit 1113, and/or the controller 1115 described above. In addition, the memory 1140 may include matching information indicating a matching relationship between a user's operation and a function of the electronic device 100. In addition, the memory 1140 may store information regarding a function that can be performed by the electronic device 100. In addition, the memory 1140 may store priority information of each function according to user's preference, and may allow the priority information to be used by the controller 1115 when functions are recommended.

According to various example embodiments, an electronic device (for example, the electronic device 100 of FIG. 1) may include: a housing (for example, the housing 110 of FIGS. 1 and 2) including a first surface, a second surface, and a side surface surrounding a space between the first surface and the second surface; at least one sensor block (for example, the sensor block 410) including at least one sensor provided on an inner side of the side surface of the housing; a sensing unit (for example, the sensing unit 1120 of FIG. 11) comprising circuitry configured to receive and to process an output value output from the at least one sensor block; at least one processor (for example, the processor 1110 of FIG. 11) operatively connected with the sensing unit; and at least one memory (for example, the memory 1140 of FIG. 11) operatively connected with the at least one processor, the at least one memory may store instructions that, when executed, cause the at least one processor to: identify an input operation, based on the output value received from the sensing unit; determine whether a function corresponding to the identified input operation exists; and, based on the corresponding function existing, execute the corresponding function.

According to various example embodiments, the sensor block may include at least two sensors (for example, the sensors 621, 623, 625, 627 of FIGS. 6, 7, 8).

The instructions, when executed, may cause the at least one processor to identify the input operation by comparing output values of the at least two sensors and a threshold value.

According to various example embodiments, the input operation may include a swiping operation, a pushing operation, a grip operation, or a combination of at least two of the swiping operation, the pushing operation, and the grip operation.

According to various example embodiments, the instructions, when executed, may cause the at least one processor to: based on any one of the output values of the at least two sensors being greater than a first threshold, determine that the pushing operation is performed at a position corresponding to a sensor outputting the corresponding output value; and, based on the output values of the at least two sensors being greater than a second threshold value in sequence, determine that the swiping operation is performed.

According to various example embodiments, the instructions, when executed, may cause the at least one processor to determine that the grip operation is performed based on at least two of the output values of the at least two sensors being greater than the first threshold value.

According to various example embodiments, the at least two sensors may include one of a strain gauge sensor, a force sensor, a pressure sensor, an ultrasonic sensor, a capacitance sensor, or a combination thereof.

According to various example embodiments, the sensor block may be provided on one side surface of the electronic device or may be provided on both opposite side surfaces of the electronic device.

According to various example embodiments, the instructions, when executed, may cause the at least one processor to: identify a plurality of operations for a pre-set first time, and identify a combination of the identified plurality of operations as the input operation; or identify a plurality of operations, and identify a combination of continuous operations of the identified plurality of operations which are performed at an interval of time shorter than a second time, as the input operation.

According to various example embodiments, the instructions, when executed, may cause the at least one processor to set a function corresponding to the input operation based on the corresponding function not existing.

According to various example embodiments, in order to set the function corresponding to the input operation, the instructions, when executed, cause the at least one processor to: inquire whether to set the function corresponding to the input operation; provide at least one function of the electronic device having a priority greater than a predetermined priority, based on learning; and set a function selected from the at least one function as the function corresponding to the input operation.

According to various example embodiments, the priority may be determined based on a number of times the least one function of the electronic device is executed.

According to various example embodiments, an electronic device (for example, the electronic device 100 of FIG. 1) may include: a housing including a first surface, a second surface, and a side surface surrounding a space between the first surface and the second surface; at least one sensor block comprising at least one sensor provided on an inner side of the side surface of the housing; a sensing unit comprising circuitry configured to receive and to process output values output from the at least one sensor block; at least one processor operatively connected with the sensing unit; and at least one memory operatively connected with the at least one processor, and the at least one memory may store instructions that, when executed, cause the at least one processor to: identify whether an input operation is an operation of pushing after swiping or an operation of swiping after pushing, based on output values of at least two sensors received from the sensing unit; execute a volume up and down key position setting function in response to the identified operation of pushing after swiping or the identified operation of swiping after pushing; and set a volume up and down key position, based on at least one of a direction of the swiping operation, a start position of the swiping operation, an end position of the swiping operation, and a position where the pushing operation is performed. through the volume up and down key position setting function.

According to various example embodiments, the instructions, when executed, may cause the at least one processor to: based on the input operation being the operation of pushing after swiping and the swiping operation is an upward swiping operation, set a position where the pushing operation is performed as the volume up key position, and set a start position of the swiping operation as the volume down key position; and, based on the input operation being the operation of pushing after swiping and the swiping operation is a downward swiping operation, set a position where the pushing operation is performed as the volume down key position, and set a start position of the swiping operation as the volume up key position.

According to various example embodiments, the instructions, when executed, may cause the at least one processor to: based on the input operation being the operation of swiping after pushing and the swiping operation is an upward swiping operation, set a position where the pushing operation is performed as the volume down key position, and set an end position of the swiping operation as the volume up key position; and, based on the input operation being the operation of swiping after pushing and the swiping operation is a downward swiping operation, set a position where the pushing operation is performed as the volume up key position, and set an end position of the swiping operation as the volume down key position.

According to various example embodiments, the instructions, when executed, may cause the at least one processor to display the set volume up and down key positions on a screen of the electronic device.

According to various example embodiments, the instructions, when executed, may cause the at least one processor to disable the set volume up and down key positions after a pre-defined third time, or based on no input on the set volume up and down key positions being received for a fourth time.

The electronic device 100 may perform the operation of executing a function of the electronic device 100 corresponding to an input operation, and, if there is no function of the electronic device 100 that corresponds to the input operation, the electronic device 100 may perform the operation of setting a function corresponding to the input operation.

Figure 12:
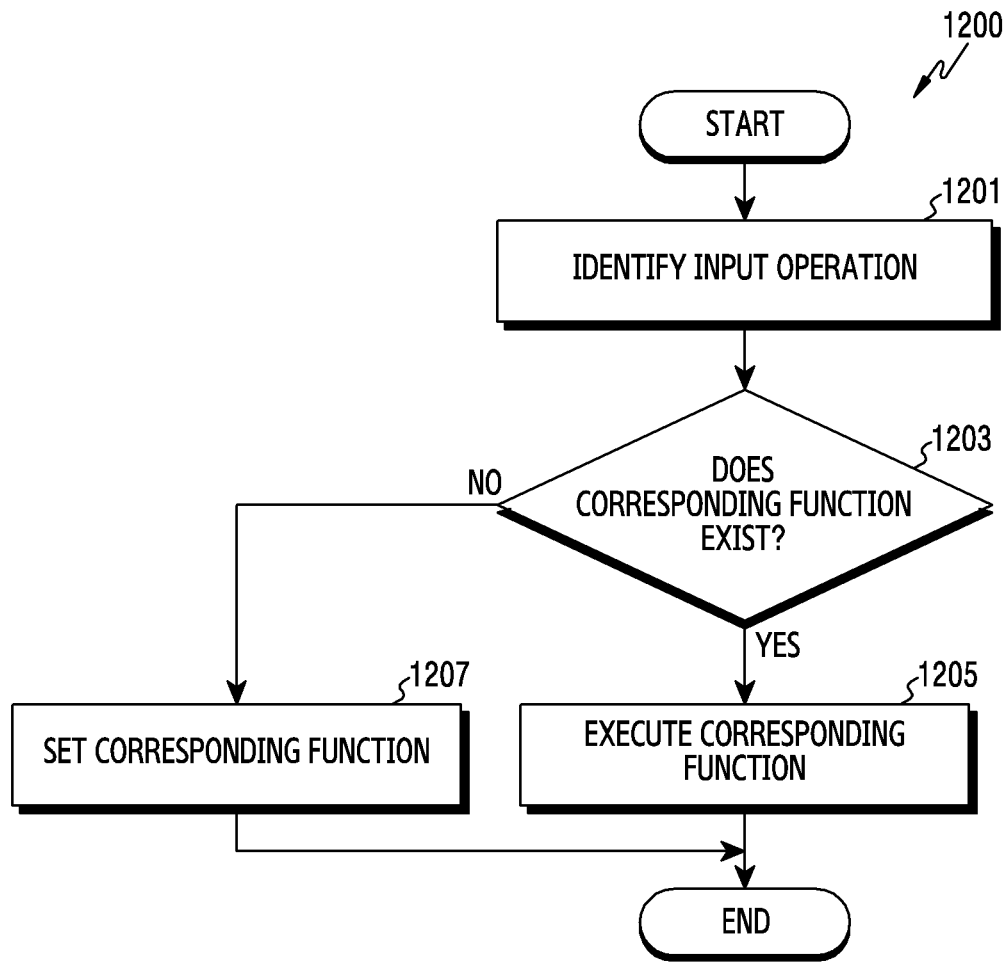
FIG. 12 is a flowchart illustrating an example operation performed in response to an input using a sensor block in an electronic device according to various embodiments.

FIG. 12 is a flowchart illustrating an example operation performed in response to an input using a sensor block in an electronic device 100 according to various embodiments. An operating entity of the flowchart 1200 illustrated in FIG. 12 may be understood as an electronic device (for example, the electronic device 100 of FIG. 1 or the electronic device 100 of FIG. 11), or a processor of the electronic device (for example, the processor 1110 of FIG. 11).

According to various embodiments, in operation 1201, the electronic device 100 may identify an operation (e.g., an operation that is input by a user) through the sensor block (for example, the sensor block 410 of FIG. 4). The operation may, for example, include, a swiping operation, a pushing operation, a touch operation, or a combination of these operations. In an embodiment, the operation may include a swiping operation, a pushing operation, an operation of pushing after swiping up, an operation of pushing after swiping down, an operation of touching after pushing after swiping up, or an operation of swiping up after pushing.

According to various embodiments, the electronic device 100 may identify the operation, based on output values of sensors (for example, the sensors 621, 623, 625, 627 of FIGS. 6, 7, 8) included in the sensor block 410. In an embodiment, when an output value of one of the sensors is greater than the first threshold value, the electronic device 100 may identify that a pushing operation is performed at a position of the corresponding sensor. In an embodiment, when output values of the sensors become greater than the second threshold value in sequence, the electronic device 100 may identify that a swiping operation is performed between positions of the corresponding sensors. In an embodiment, the electronic device 100 may recognize that a touch is input from the touch input unit 1150, and may identify a series of operations input by associating the touch with a previous, next swiping operation or pushing operation, based on a time when the touch is inputted and/or a position where the touch is inputted.

According to various embodiments, in operation 1203, the electronic device 100 may determine whether a function corresponding to the identified input operation exists. The electronic device 100 may determine whether the function of the electronic device 100 corresponding to the input operation exists, based on mapping information stored in the memory 1140.

According to various embodiments, when it is determined that the function corresponding to the identified input operation exists ("Yes" in operation 1203), the electronic device 100 may execute the corresponding function in operation 1205. In an embodiment, the electronic device 100 may execute a volume-up/down function, a screen brightness setting function.

According to various embodiments, when it is determined that the function corresponding to the identified input operation does not exist ("No" in operation 1203), the electronic device 100 may set a function of the electronic device 100 corresponding to the identified input operation, by, for example, interacting with the user, in operation 1207. In an embodiment, the electronic device 100 may inquire the user about whether to set a corresponding function, and may display settable functions for the user in response to user's answering that the function is set, and may set a function selected by the user as a function corresponding to the identified user's input operation. The electronic device 100 may add information of the set function to the mapping information and may store the information in the memory 1140.

Figure 13:
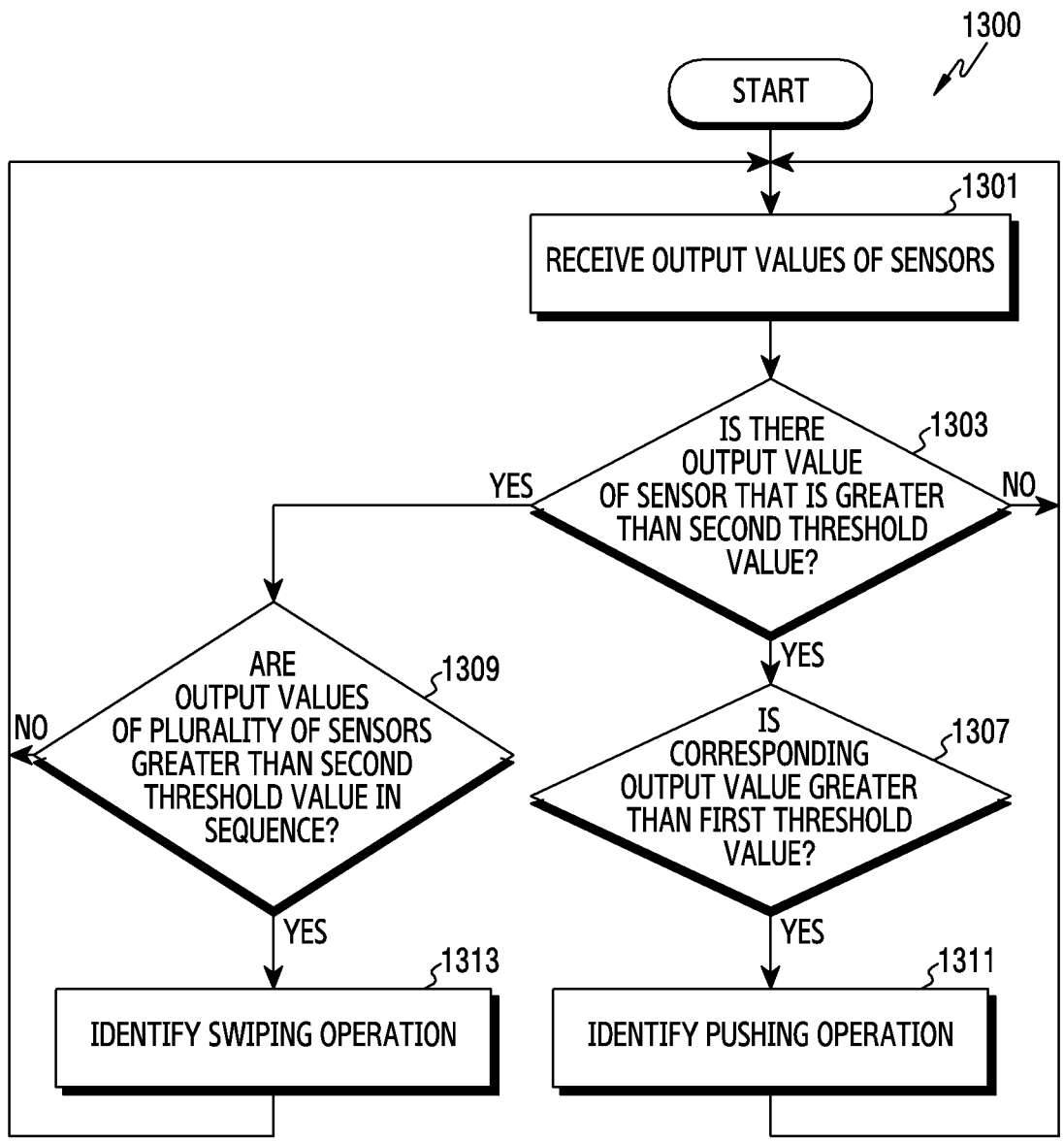
FIG. 13 is a flowchart illustrating an example operation of identifying an input in an electronic device according to various embodiments.

FIG. 13 is a flowchart 1300 illustrating an example operation of identifying an input in an electronic device 100 according to various embodiments. An operating entity of the flowchart 1300 illustrated in FIG. 13 may be understood as an electronic device (for example, the electronic device 100 of FIG. 1, or the electronic device 100 of FIG. 11), or a processor of the electronic device (for example, the processor 1110 of FIG. 11). The flowchart 1300 illustrated in FIG. 13 may be an embodiment of operation 1201 of FIG. 12.

According to various embodiments, in operation 1301, the electronic device 100 may receive output values of sensors included in a sensor block (for example, the sensor block 410 of FIG. 4). In addition, in operation 1303, the electronic device may determine whether there is an output value that is greater than the second threshold value for identifying swiping. When there is no output value that is greater than the second threshold value ("No" in operation 1303), the electronic device 100 may resume operation 1301 to receive output values of the sensors.

According to various embodiments, when there is an output value that is greater than the second threshold value as a result of determining in operation 1303 ("Yes" in operation 1303), the electronic device 100 may determine whether the corresponding output value is greater than the first threshold value for identifying pushing in operation 1307. When the corresponding output value is greater than the first threshold value as a result of determining ("Yes" in operation 1307), the electronic device 100 may identify that a pushing operation is in operation 1311. In addition, when there is an output value that is greater than the second threshold value as a result of determining in operation 1303 ("Yes" in operation 1303), the electronic device 100 may determine whether output values of the plurality of sensors are greater than the second threshold value in sequence in operation 1309, and, when the output values of the plurality of sensors are greater than the second threshold value in sequence ("Yes" in operation 1309), the electronic device may identify that a swiping operation is input in operation 1313.

According to various embodiments, the operations of the electronic device 100 illustrated in FIG. 13 may be unlimitedly repeated, and all operations within a pre-defined time may be combined into a series of operations and may be identified as a user's input operation, or all operations intervals of which do not exceed a pre-defined time may be combined into a series of operations and may be identified as a user's input operation. In addition, when there is a touch operation within a pre-set time before or after the identified user's input operation, the touch operation may be additionally included in the user's input operation.

Figure 14:
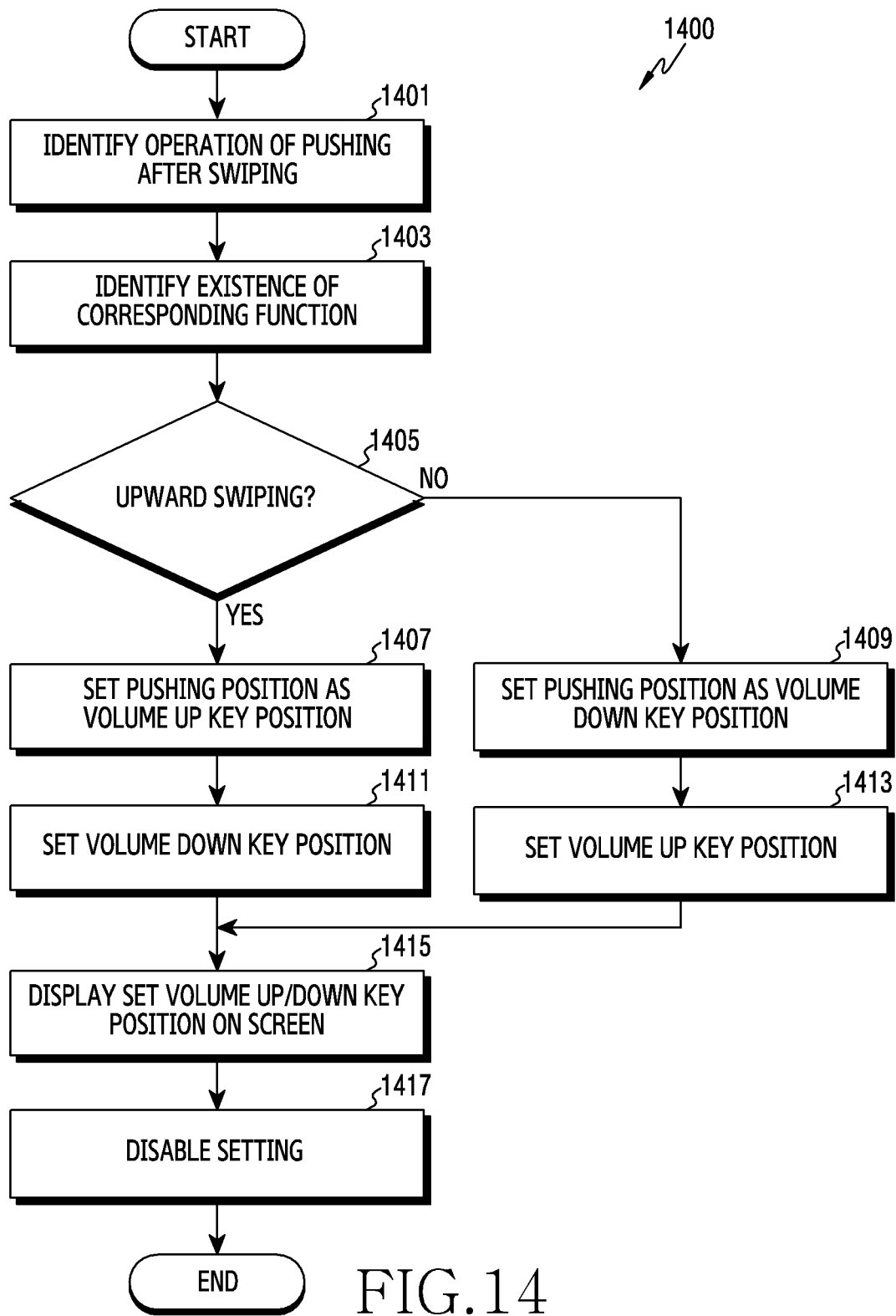
FIG. 14 is a flowchart illustrating an example operation performed in response to an input operation of pushing after swiping in an electronic device according to various embodiments.

FIG. 14 is a flowchart 1400 illustrating an example operation performed in response to an input of an operation of pushing after swiping in an electronic device 100 according to various embodiments. An operating entity of the flowchart 1400 illustrated in FIG. 14 may be understood as an electronic device (for example, the electronic device 100 of FIG. 1, or the electronic device 100 of FIG. 11), or a processor of the electronic device (for example, the processor 1110 of FIG. 11).

According to various embodiments, in operation 1401, the electronic device 100 may identify an operation input through a sensor block (for example, the sensor block 410 of FIG. 4). According to an embodiment, the electronic device 100 may identify that the operation is an operation of pushing after swiping.

According to various embodiments, in operation 1403, the electronic device 100 may determine whether there exists a function that corresponds to the identified input operation of 'pushing after swiping'. In an embodiment, the electronic device 100 may determine whether there exists a volume key position setting function as the function corresponding to the operation of 'pushing after swiping', based on mapping information stored in the memory 1140.

According to various embodiments, in operation 1405, the electronic device 100 may determine whether the input operation is an upward swiping operation, based on parameters such as upward/downward swiping, a swiping start position, a swiping end position, a pushing position, which are obtained concurrently with the identified operation of 'pushing after swiping'.

According to various embodiments, when it is determined that the input operation is the upward swiping operation ("Yes" in operation 1405), the electronic device 100 may set the pushing position as a volume-up key position in operation 1407, and, when it is determined that the user's input operation is a downward swiping operation ("No" in operation 1405), the electronic device 100 may set the pushing position as a volume-down key position in operation 1409. According to an embodiment, when it is determined that the input operation is the upward swiping operation, the electronic device 100 may set an end position of the swiping as the volume-up key position in operation 1407, and, when it is determined that the user's input operation is the downward swiping operation, the electronic device 100 may set an end position of the swiping as the volume-down key position in operation 1409.

According to various embodiments, the electronic device 100 may set a volume-down key position in operation 1411, and may set a volume-up key position in operation 1413. According to an embodiment, the electronic device 100 may set a start position of the swiping as the volume-down key position or the volume-up key position in operation 1411 or 1413. According to an embodiment, the electronic device 100 may set a position a pre-set distance blow the volume-up key position set in operation 1407, as the volume-down key position, in operation 1411, or may set a position a pre-set distance above the volume-down key position set in operation 1409, as the volume-up key position, in operation 1413. According to an embodiment, the electronic device may set the volume-down key position or the volume-up key position, based on a user's characteristic (for example, a size of user's hand, a length of user's finger) in operation 1411 or 1413.

According to various embodiments, in operation 1415, the electronic device 100 may inform the user of the set volume-up/down key position by displaying the volume-up/down key position on the screen.

According to various embodiments, in operation 1417, the electronic device 100 may disable the set volume-up/down key position. In an embodiment, the electronic device 100 may disable the set key position after a pre-set time is elapsed after the key position is set. For example, when there is no user input on the key position for a pre-set time, the electronic device 100 may disable the set key position. The user may newly set a volume-up/down key position by inputting a new operation of "pushing after swiping".

Although it is illustrated in FIG. 14 that a volume-up/down key position is newly set according to an operation of "pushing after swiping", the volume-up/down key position may be newly set according to an operation of "swiping after pushing" in a similar method.

According to various example embodiments, a method of operating an electronic device (for example, the electronic device 100 of FIG. 1) may include: identifying an input operation, by comparing output values of at least two sensors provided on a side surface of the electronic device and a threshold value; determining whether a function corresponding to the identified input operation exists; and, based on the corresponding function existing, executing the corresponding function.

According to various example embodiments, the input operation may include a swiping operation, a pushing operation, a grip operation, or a combination of at least two of the swiping operation, the pushing operation, and the grip operation, and identifying the input operation performed may include: based on any one of the output values of the at least two sensors being greater than a first threshold, identifying that the pushing operation is performed at a position corresponding to a sensor outputting the corresponding output value; based on the output values of the at least two sensors being greater than a second threshold value in sequence, identifying that the swiping operation is performed; and, based on at least two of the output values of the at least two sensors being greater than the first threshold value, identifying that the grip operation is performed.

According to various example embodiments, identifying the input operation may include: identifying a plurality of operations performed for a pre-set first time, and identifying a combination of the identified plurality of operations as the input operation; or identifying a plurality of operations, and identifying a combination of continuous operations of the identified plurality of operations performed at an interval of time shorter than a second time, as the input operation.

According to various example embodiments, identifying the input operation may include identifying an operation of pushing after swiping or identifying an operation of swiping after pushing, and executing the corresponding function may include: executing a volume up and down key position setting function in response to the identified operation of pushing after swiping or the identified operation of swiping after pushing; and setting a volume up and down key position, based on at least one of a direction of the swiping operation, a start position of the swiping operation, an end position of the swiping operation, and a position where the pushing operation is performed.

According to various example embodiments described above, the disclosure may provide a housing of a keyless structure and can address limiting factors of a design, and may provide a function of setting a key position according to user's selection to provide user's convenience under the key structure.

In addition, the disclosure enables a function of the electronic device corresponding to various inputs to be directly executed, such that user's convenience can be further enhanced.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code made by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by one of ordinary skill in the art that various changes in form and detail may be made without departing from the true spirit and full scope of the disclosure, including the appended claims and their equivalents.

What is claimed is:

1. An electronic device comprising:
a housing comprising a first surface, a second surface, and a side surface surrounding a space between the first surface and the second surface;
at least one sensor block comprising a plurality of sensors provided on an inner side of the side surface of the housing for detecting input operations to an external side of the side surface;
a sensing unit comprising circuitry configured to receive and to process an output value output from the at least one sensor block;
at least one processor operatively connected with the sensing unit; and
at least one memory operatively connected with the at least one processor,
wherein the at least one memory stores instructions that, when executed, cause the at least one processor to:
identify an input operation by comparing output values, received from the sensing unit, of at least two sensors among the plurality of sensors and a threshold value, wherein the input operation includes a swiping operation identified based on the output values corresponding to the at least two sensors;
determine whether a function corresponding to the identified input operation exists; and
based on the corresponding function existing, execute the corresponding function.

2. The electronic device of claim 1, wherein the input operation includes a pushing operation performed before or after the swiping operation, and the function corresponding to the identified input operation is determined based on a direction of the swiping operation, a start position of the swiping operation, an end position of the swiping operation, and a position where the pushing operation is performed.

3. The electronic device of claim 1, wherein the input operation includes a pushing operation, a grip operation, or a combination of at least two of the swiping operation, the pushing operation, and the grip operation.

4. The electronic device of claim 3, wherein the instructions, when executed, cause the at least one processor to:
identify a plurality of operations for a pre-set first time, and identify a combination of the identified plurality of operations as the input operation; or
identify a plurality of operations, and identify a combination of continuous operations of the identified plurality of operations performed at an interval of time shorter than a second time, as the input operation.

5. The electronic device of claim 3, wherein the instructions, when executed, cause the at least one processor to:
based on any one of the output values of the at least two sensors being greater than a first threshold, determine that the pushing operation is performed at a position corresponding to a sensor outputting the corresponding output value; and
based on the output values of the at least two sensors being greater than a second threshold value in sequence, determine that the swiping operation is performed.

6. The electronic device of claim 5, wherein the instructions, when executed, cause the at least one processor to determine that the grip operation is performed based on at least two of the output values of the at least two sensors being greater than the first threshold value.

7. The electronic device of claim 1, wherein the at least two sensors include one of a strain gauge sensor, a force sensor, a pressure sensor, an ultrasonic sensor, a capacitance sensor, or a combination thereof.

8. The electronic device of claim 1, wherein the sensor block is provided on one side surface of the electronic device or is provided on both opposite side surfaces of the electronic device.

9. The electronic device of claim 1, wherein the instructions, when executed, cause the at least one processor to set a function corresponding to the input operation based on the corresponding function not existing.

10. The electronic device of claim 9, wherein, to set the function corresponding to the input operation, the instructions, when executed, cause the at least one processor to:
inquire whether to set the function corresponding to the input operation;
provide at least one function of the electronic device having a priority greater than a predetermined priority, based on learning; and
set a selected function as the function corresponding to the input operation.

11. The electronic device of claim 10, wherein the priority is determined based on a number of times the least one function of the electronic device is executed.

12. An electronic device comprising:
a housing comprising a first surface, a second surface, and a side surface surrounding a space between the first surface and the second surface;
at least one sensor block comprising a plurality of sensors provided on an inner side of the side surface of the housing for detecting input operations to an external side of the side surface;
a sensing unit comprising circuitry configured to receive and to process output values output from the at least one sensor block;
at least one processor operatively connected with the sensing unit; and at least one memory operatively connected with the at least one processor,
wherein the at least one memory stores instructions that, when executed, cause the at least one processor to:
identify whether an input operation is an operation of pushing after swiping or an operation of swiping after pushing, based on output values of at least two sensors among the plurality of sensors received from the sensing unit;
execute a volume up and down key position setting function in response to the identified operation of pushing after swiping or the identified operation of swiping after pushing; and
set a volume up and down key position, based on at least one of a direction of the swiping operation, a start position of the swiping operation, an end position of the swiping operation, and a position where the pushing operation is performed, through the volume up and down key position setting function.

13. The electronic device of claim 12, wherein the instructions, when executed, cause the at least one processor to:
based on the input operation being the operation of pushing after swiping and the swiping operation being an upward swiping operation, set a position where the pushing operation is performed as the volume up key position, and set a start position of the swiping operation as the volume down key position; and
based on the input operation being the operation of pushing after swiping and the swiping operation being a downward swiping operation, set a position where the pushing operation is performed as the volume down key position, and set a start position of the swiping operation as the volume up key position.

14. The electronic device of claim 12, wherein the instructions, when executed, cause the at least one processor to:
based on the input operation being the operation of swiping after pushing and the swiping operation being an upward swiping operation, set a position where the pushing operation is performed as the volume down key position, and set an end position of the swiping operation as the volume up key position; and
based on the input operation being the operation of swiping after pushing and the swiping operation being a downward swiping operation, set a position where the pushing operation is performed as the volume up key position, and set an end position of the swiping operation as the volume down key position.

15. The electronic device of claim 12, wherein the instructions, when executed, cause the at least one processor to control the electronic device to display the set volume up and down key positions on a screen of the electronic device.

16. The electronic device of claim 12, wherein the instructions, when executed, cause the at least one processor to disable the set volume up and down key positions after a pre-defined third time, or based on no input being received on the set volume up and down key positions for a fourth time.

17. A method of operating an electronic device including at least one sensor block comprising a plurality of sensors provided on an inner side of a side surface of a housing of the electric device for detecting input operations to an external side of the side surface, the method comprising:
identifying an input operation by comparing output values of the at least two sensors provided on the side surface of the electronic device and a threshold value, wherein the input operation includes a swiping operation identified based on the output values of the at least two sensors;
determining whether a function corresponding to the identified input operation exists; and
based on the corresponding function existing, executing the corresponding function.

18. The method of claim 17, wherein the input operation includes a pushing operation, a grip operation, or a combination of at least two of the swiping operation, the pushing operation, and the grip operation, and
wherein identifying the input operation comprises:
based on any one of the output values of the at least two sensors being greater than a first threshold, identifying that the pushing operation is performed at a position corresponding to a sensor outputting the corresponding output value;
based on the output values of the at least two sensors being greater than a second threshold value in sequence, identifying that the swiping operation is performed; and
based on at least two of the output values of the at least two sensors being greater than the first threshold value, identifying that the grip operation is performed.

19. The method of claim 18, wherein identifying the input operation comprises:
identifying a plurality of operations for a pre-set first time, and identifying a combination of the identified plurality of operations as the input operation; or
identifying a plurality of operations, and identifying a combination of continuous operations of the identified plurality of operations which are performed at an interval of time shorter than a second time, as the input operation.

20. The method of claim 19, wherein identifying the input operation comprises identifying an operation of pushing after swiping or identifying an operation of swiping after pushing, and
wherein executing the corresponding function comprises:
executing a volume up and down key position setting function in response to the identified operation of pushing after swiping or the identified operation of swiping after pushing; and
setting a volume up and down key position, based on at least one of a direction of the swiping operation, a start position of the swiping operation, an end position of the swiping operation, and a position where the pushing operation is performed.

* * * * *